United States Patent
Noro et al.

(10) Patent No.: US 6,646,677 B2
(45) Date of Patent: *Nov. 11, 2003

(54) IMAGE SENSING CONTROL METHOD AND APPARATUS, IMAGE TRANSMISSION CONTROL METHOD, APPARATUS, AND SYSTEM, AND STORAGE MEANS STORING PROGRAM THAT IMPLEMENTS THE METHOD

(75) Inventors: Hideo Noro, Tokyo (JP); Akitomo Sasaki, Kawasaki (JP); Shigeo Suzuki, Yokohama (JP); Kiyoshi Oka, Huutington Beach, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/955,213

(22) Filed: Oct. 21, 1997

(65) Prior Publication Data

US 2002/0135677 A1 Sep. 26, 2002

(30) Foreign Application Priority Data

| Oct. 25, 1996 | (JP) | 8-284446 |
| Oct. 25, 1996 | (JP) | 8-284473 |
| Nov. 29, 1996 | (JP) | 8-319894 |
| Nov. 29, 1996 | (JP) | 8-320559 |

(51) Int. Cl.$^7$ ................................................ H04N 7/18
(52) U.S. Cl. ............... 348/156; 348/13; 348/16; 348/159; 348/211.99; 348/143; 455/3.03
(58) Field of Search ............ 348/8, 12–19, 348/143, 153, 156, 159, 211, 212–213; 455/3.03, 3.04, 3.05

(56) References Cited

U.S. PATENT DOCUMENTS

| 4,992,866 A | * | 2/1991 | Morgan | 348/159 |
| 4,995,071 A | * | 2/1991 | Weber et al. | 348/15 |
| 5,182,641 A | * | 1/1993 | Diner et al. | 348/86 |
| 5,559,945 A | * | 9/1996 | Beaudet et al. | 395/353 |
| 5,579,060 A | * | 11/1996 | Elberbaum | 348/705 |
| 5,600,368 A | * | 2/1997 | Matthews, III | 348/143 |
| 5,652,849 A | * | 7/1997 | Conway et al. | 345/327 |
| 5,657,246 A | * | 8/1997 | Hogan et al. | 348/15 |
| 5,745,161 A | * | 4/1998 | Ito | 348/15 |
| 5,745,380 A | * | 4/1998 | Sandvoss et al. | 379/90.01 |

(List continued on next page.)

FOREIGN PATENT DOCUMENTS

| JP | 5-300510 | 11/1993 | H04N/7/15 |
| JP | 6-044155 | 2/1994 | H04N/7/13 |
| JP | 6-197333 | 7/1994 | H04N/7/14 |
| JP | 6-197336 | 7/1994 | H04N/7/14 |
| JP | 8-084327 | 3/1996 | H04N/7/14 |

*Primary Examiner*—Vu Le
(74) *Attorney, Agent, or Firm*—Morgan & Finnegan, L.L.P.

(57) ABSTRACT

This invention relates to an image sensing control method and apparatus, and an image transmission control method, apparatus, and system, in which a camera such as a video camera is connected, the operation of the camera is controlled in accordance with a control command sent from a client via a network, and an image signal sensed by the camera is transmitted to the client via the network. Upon reception of a control command of the pan and tilt angles, zoom value, or the like of the camera from the client, the position control of the camera is done in accordance with the command, and transmission of the image signal sensed by the camera is suspended until the instructed operation is complete. Alternatively, upon reception of such control command, the image signal sensed by the camera is compressed at a high compression ratio, and the compressed image signal is transmitted. On the client device, received image signal is directly displayed without buffering during the control operation, thus allowing real-time image display during the position control of the camera.

22 Claims, 28 Drawing Sheets

U.S. PATENT DOCUMENTS

| | | | | |
|---|---|---|---|---|
| 5,758,079 A | * | 5/1998 | Ludwig et al. | 709/204 |
| 5,764,276 A | * | 6/1998 | Martin et al. | 348/13 |
| 5,793,415 A | * | 8/1998 | Gregory, III et al. | 348/15 |
| 5,857,190 A | * | 1/1999 | Brown | 707/10 |
| 5,867,484 A | * | 2/1999 | Shaunfield | 370/254 |
| 5,917,543 A | * | 6/1999 | Uehara | 348/214 |
| 5,978,835 A | * | 11/1999 | Ludwig et al. | 709/204 |
| 6,084,631 A | * | 7/2000 | Tonkin et al. | 348/212 |
| 6,137,485 A | * | 10/2000 | Kawai et al. | 348/15 |
| 6,476,854 B1 | * | 11/2002 | Emerson et al. | 220/559 |

* cited by examiner

FIG. 4
OBJECT A 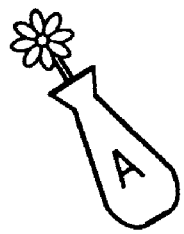
OBJECT B 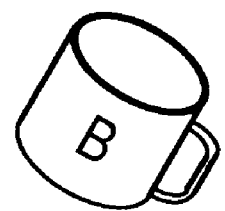
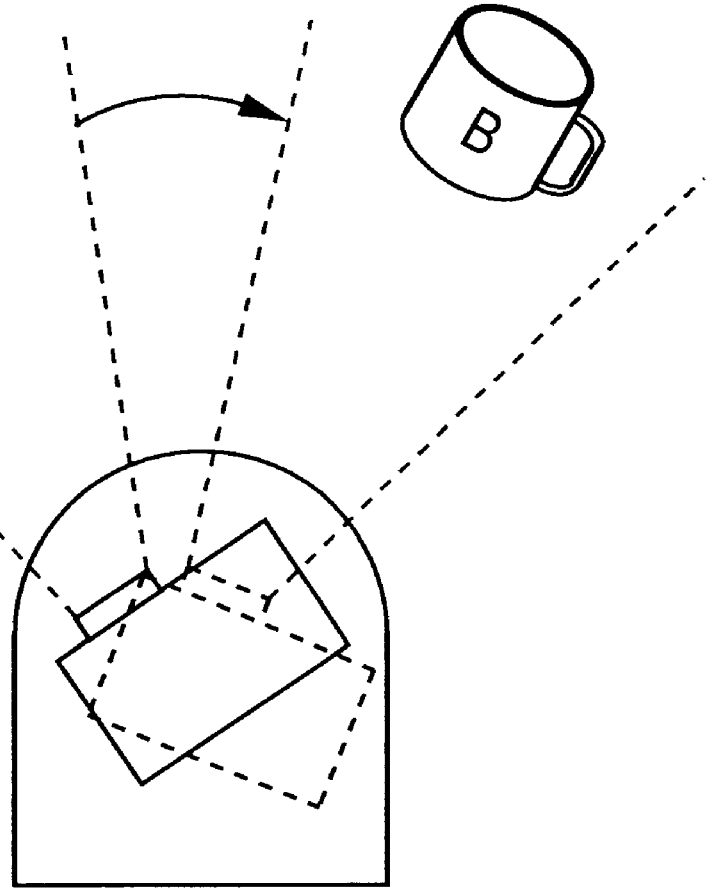

F I G. 26
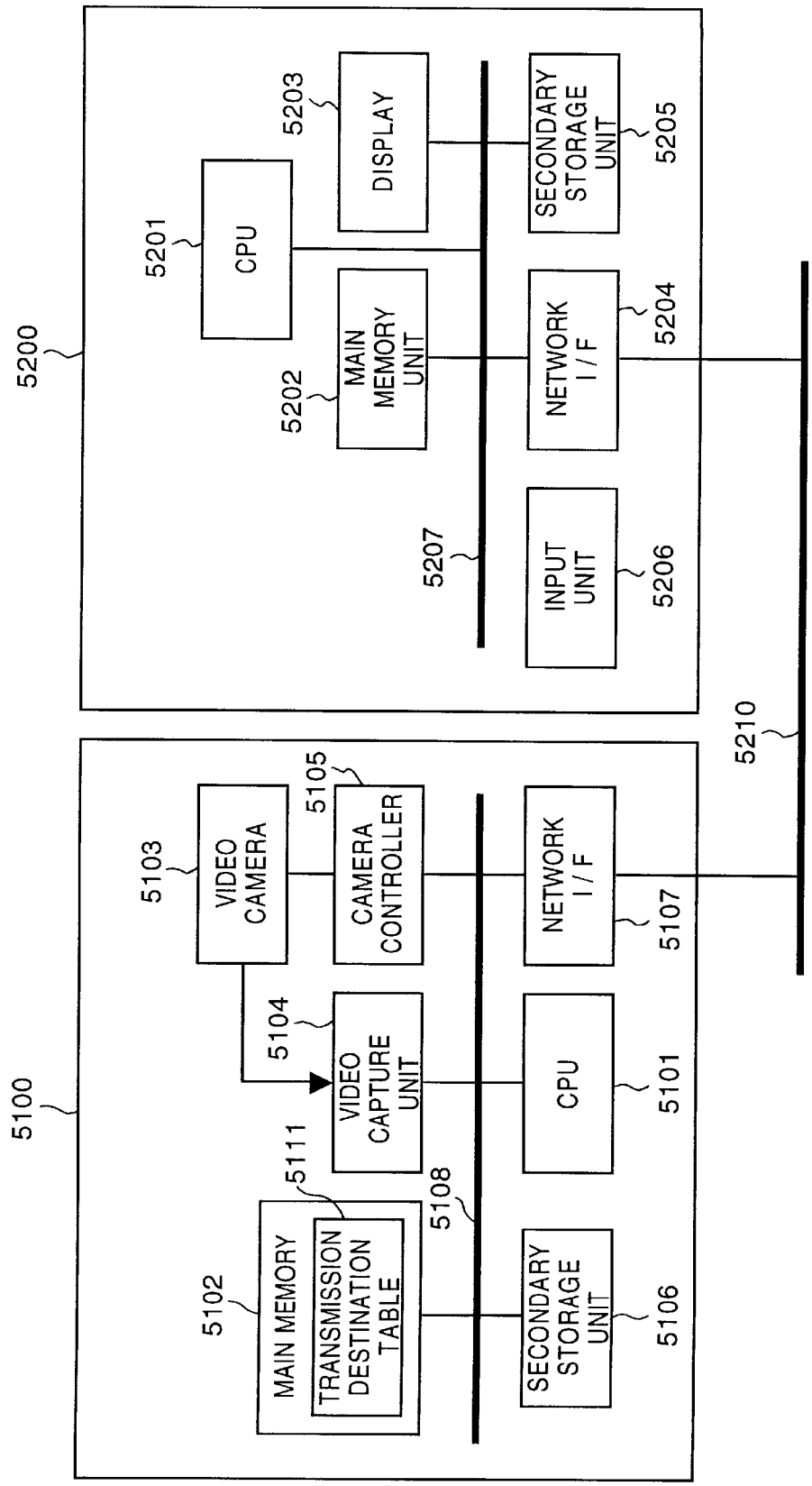

| CLIENT NAME | RIGHT OF ACCESS |
|---|---|
| A | PRESENT |
| B | ABSENT |
| C | ABSENT |
| D | ABSENT |
| E | ABSENT |

5111

5500 — DESTINATION ADDRESS
5501 — IMAGE DATA OR CONTROL DATA

IMAGE SENSING CONTROL METHOD AND APPARATUS, IMAGE TRANSMISSION CONTROL METHOD, APPARATUS, AND SYSTEM, AND STORAGE MEANS STORING PROGRAM THAT IMPLEMENTS THE METHOD

BACKGROUND OF THE INVENTION

The present invention relates to an image sensing control method and apparatus for remote-controlling an image sensing device such as a still camera, video camera, and the like, an image transmission control method, apparatus, and system for transmitting the sensed image, and a computer readable storage medium that stores a program for implementing the method.

A camera control system in which a plurality of cameras each having pan and tilt functions and a zoom function are set at the respective positions, and an operation device at the central position or an arbitrary position is connected to these cameras via a dedicated communication line to remote-control an arbitrary camera, is known. In such system, control signals (cables or signal lines) for transmitting camera control/status signals are required in addition to cables for transmitting video/audio signals. Also, a method of modulating these camera control/status signals and superposing them on video/audio signals is known. Theoretically speaking, however, such method is equivalent to a method of assigning separate communication channels to individual signals.

In such camera control system (a system that remote-controls cameras using the dedicated communication line), an apparatus for remote-controlling a camera is fixed in position, and becomes a bottleneck against easy system expansion.

For this reason, it is preferable to remote-control cameras on a network built by computers and the like. This is because both an apparatus for controlling a camera and an apparatus for remote-controlling a camera operate as members of a computer network (to be simply referred to as a network hereinafter), and users can freely remote-control these apparatuses from terminals (e.g., personal computers or the like) connected to the network.

On the other hand, a camera conference system that transmits audio signals onto the network in addition to images sensed by the cameras is receiving a lot of attention.

FIG. 1 schematically shows a general image communication system including the above-mentioned camera conference system. FIG. 2 is a schematic block diagram showing the arrangement of the image communication system shown in FIG. 1. A communication terminal 100 serves as an image server for controlling, e.g., a video camera and transmitting the image sensed by the camera comprises a computer main body 101, a keyboard 102, a mouse 103, a display 104, and a video camera 105, as shown in FIG. 1. A communication terminal 200 serving as an image client which receives image data from the communication terminal 100 and displays the received image comprises a computer main body 201, a keyboard 202, a mouse 203, and a display 204, as shown in FIG. 1. The communication terminals 100 and 200 (client) are connected via a network 300 to be able to communicate with each other.

As shown in FIG. 2, the image sensed by the video camera 105 of the communication terminal 100 is converted into digital data by an image input unit 110. The digital image data for one frame is packetized by a network transmitter/receiver 111, and the obtained packet is output onto the network 300. The packet output onto the network 300 is received by a network transmitter/receiver 211 of the client (communication terminal 200). Upon reception of the packet, the client converts the received packet into data, and stores the data in an image buffer 210. The client reads out the image data from the image buffer 210 at a predetermined timing, and displays the image on the display 204.

By repeating the above operation, moving images captured by the communication terminal 105 via the video camera 105 can be displayed on the client side. The image data is stored in the image buffer 210 for the following reason.

A packet on the network has fluctuation (jitter) with respect to time for various reasons. FIG. 3 shows this state. As shown in FIG. 3, even when the transmitter side of image data transmits the image data for one frame at a predetermined interval T, the receiver side does not always receive the image data at the predetermined interval T due to the influence of the jitter. For this reason, the reception interval may broaden, as indicated by A in FIG. 3, or may narrow, as indicated by B in FIG. 3.

Hence, if the client displays the received data immediately without going through the image buffer 210, the motion of images displayed on the display 204 may be too slow (the portion A) or too fast (the portion B). In order to prevent such irregular motion, image signals for a time that can absorb the jitter are normally buffered in the image buffer 210, and the stored signals are read out at the same timing as that upon capture of the images in the image reproduction mode, thus removing the influence of the jitter.

However, this conventional system does not consider any case wherein the video camera 105, the pan, tilt, zoom functions and the like of which can be externally controlled, is connected to the terminal 100, and the position of the video camera 105 is controlled by a client on which an image is being displayed. This problem will be explained in detail below. In the conventional system, since the image data to be displayed are buffered by the receiving communication terminal 200, the image acquisition time has a large difference from the image display time. For this reason, when the client on which an image is being displayed controls the pan, tilt, or zoom function of the video camera 105 while observing the displayed image, a certain lag time is produced from when the user controls a function of the video camera 105 until the image corresponding to the controlled function is displayed on the client side. Hence, the user controls the video camera 105 more than he or she wanted, and e.g., the field of view of the video camera 105 moves beyond the angle that the user intended.

A problem posed when the angle (including pan and tilt angles and zoom ratio) of the camera has changed will be explained below.

For example, as shown in FIG. 4, assume that a camera which points in a direction of an object A is panned to sense the image of an object B. In this case, since the transmission data volume is constant, images are captured at a predetermined frame rate and image data is kept transmitted to the client while the camera angle is being changed from the object A to the object B.

Such images transmitted during the change from the object A to the object B may be desirable in some respects, but are not so significant for the user who knows the positional relationship between the objects A and B. In fact, such user may feel that nonsense images are transmitted/received.

When the above-mentioned camera control communication terminal (camera control device) and client are built on the network, transmission of unwanted information is preferably precluded, since it influences the operability of other users on the network.

In particular, the "Internet" is receiving a lot of attention. When camera control devices and clients are built on such huge network, the above-mentioned problem comes into focus inevitably.

In the system that transmits images using digital transmission media such as the Internet, in general, the sensed digital image data is compressed by a compression technique, e.g., Motion JPEG, MPEG, or the like, and the compressed image data is transmitted. The compressed image data is expanded by a device (to be referred to as a viewer hereinafter), and thereafter, the expanded image is displayed on the display.

However, in such conventional system, it is a common practice not to perform compression processing upon transmission of images, or to permanently use a single compression scheme suitable for image contents or network characteristics (transmission rate or the like), if compression processing is done. For this reason, when an uncompressed image signal is transmitted from a network with a low transmission rate or when the frame rate drops since an image is compressed by a compression scheme suitable for a high-resolution image (a scheme with a low compression rate), if the user makes camera control such as panning or tilting, images are displayed intermittently. As a result, the user fails to recognize the current state (e.g., pan or tilt angle) of the camera which is sensing an image in real time.

In such image transmission system, the images to be transmitted to all the clients are subjected to identical compression or image processing independently of whether or not the client who receives media data has the right of access to that video camera. That is, an identical media processing method is used for all the clients. For this reason, even when the client who has the right of camera access wants to observe an image with higher resolution so as to control the operation of the camera, he or she can only observe the image with a normal resolution. On the other hand, a client who has no right of camera access need not observe an image with a high resolution, and wants to display images in real time at high speed. However, such switching cannot be done in the conventional system.

On the client, image packets are stored using the image buffer (jitter buffer), and frame images to be displayed are generated using the stored packets, as described above. On the other hand, in order to satisfactorily attain camera control at the client having the right of camera access, images are preferably reproduced in real time so as to recognize images of the sensed object in real time.

SUMMARY OF THE INVENTION

The present invention has been made in consideration of the above-mentioned problems, and has as its object to provide an image sensing control method and apparatus, image transmission control method, apparatus, and system, and a storage medium that stores a program for implementing the method, which suppress the transmission volume of sensed image data until an image sensing angle, magnification of an image sensing device reaches a desired angle, so that a desired image sensing angle by an operator can be quickly obtained, and the load on the network during changes in angle and/or magnification can be reduced.

It is another object of the present invention to provide an image sensing control method and apparatus, image transmission control method, apparatus, and system, and a storage medium that stores a program for implementing the method, which change a compression method of an image signal during operation control of an image sensing apparatus, and transmit the image signal compressed by the changed compression method onto the network, so that changes in image by the operation control of the image sensing device can be detected in real time via the network.

It is another object of the present invention to provide an image sensing control method and apparatus, image transmission control method, apparatus, and system, and a storage medium that stores a program for implementing the method, which increase the compression ratio of an image signal sensed by an image sensing device when the operation of the image sensing device is controlled, and transmit the image signal compressed at a high compression rate, so that the time required for transmitting the image signal can be shortened, and any lag of image signals sensed by the image sensing device during the operation control can be reduced.

It is another object of the present invention to provide an image sensing control method and apparatus, image transmission control method, apparatus, and system, and a storage medium that stores a program for implementing the method, which can reduce any lag between the time at which the transmitter acquired images by controlling an image sensing device and the time at which a client receives and displays that image signal upon remote-control of the image sensing device, and can improve the response of displayed images with respect to the operation state of the image sensing device when the client remote-controls the image sensing device while observing the displayed images.

It is another object of the present invention to provide an image sensing control method and apparatus, image transmission control method, apparatus, and system, and a storage medium that stores a program for implementing the method, which can quickly display image signals acquired by a control device after an operation of an image sensing device when a client remote-controls the image sensing device via a control device of the image sensing device.

It is another object of the present invention to provide an image sensing control method and apparatus, image transmission control method, apparatus, and system, and a storage medium that stores a program for implementing the method, which change the processing method of an image signal to be transmitted to a client depending on whether or not the client who receives an image signal sensed by an image sensing device via a network has the right of access to the image sensing device.

It is another object of the present invention to provide an image sensing control method and apparatus, image transmission control method, apparatus, and system, and a storage medium that stores a program for implementing the method, which transmit an image signal which is converted into low-compression codes, to a client who has the right of access to an image sensing device, and transmit an image signal, which is converted into high-compression codes, to a client who has no right of access.

It is another object of the present invention to provide an image sensing control method and apparatus, image transmission control method, apparatus, and system, and a storage medium that stores a program for implementing the method, in which a client who has the right of access to an image sensing device, comprises a small-capacity jitter absorption buffer, and a client who has no right of access comprises a large-capacity jitter absorption buffer.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 4 is a view showing the state of changing objects of a camera;

FIG. 26 is a block diagram showing the arrangement of an image communication system according to the fifth embodiment of the present invention;

DESCRIPTION OF THE PREFERRED EMBODIMENTS

The preferred embodiments of the present invention will be described in detail hereinafter with reference to the accompanying drawings.

[First Embodiment]

Figure 1:
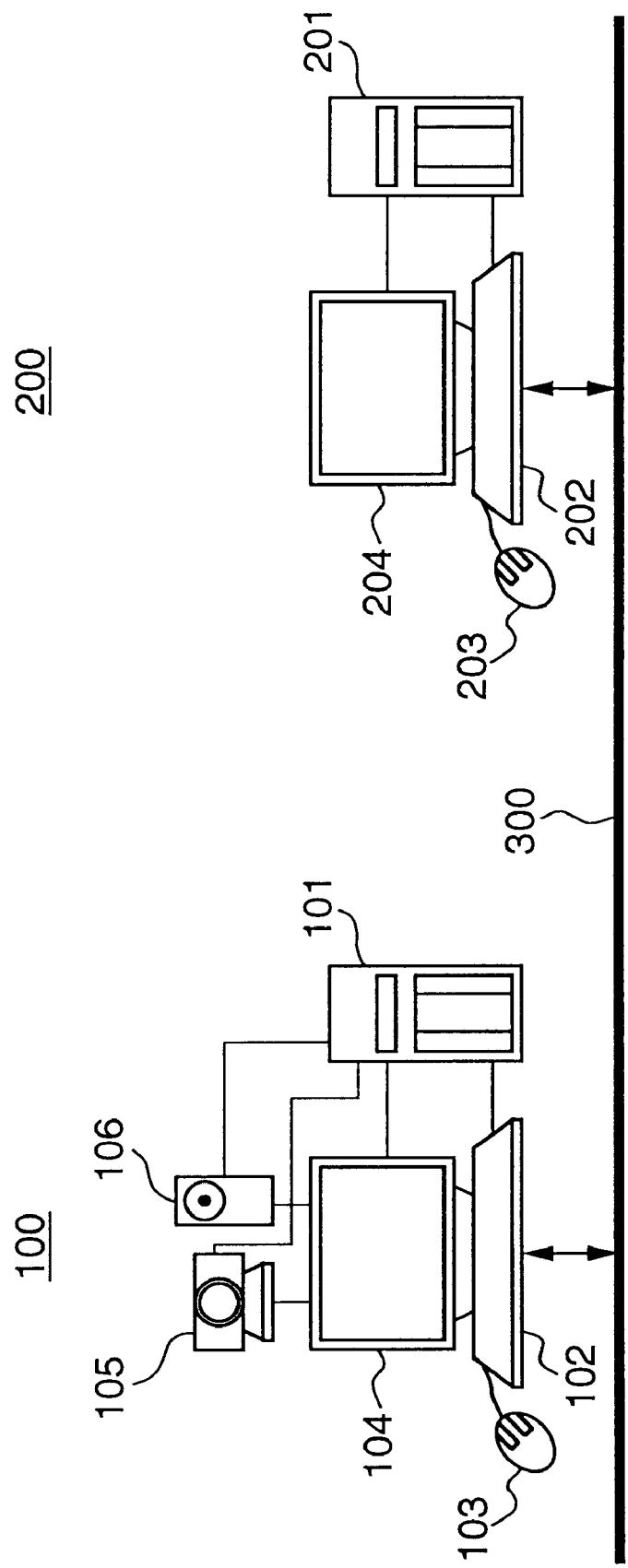
FIG. 1 is a schematic diagram showing a general image communication system.
Figure 2:
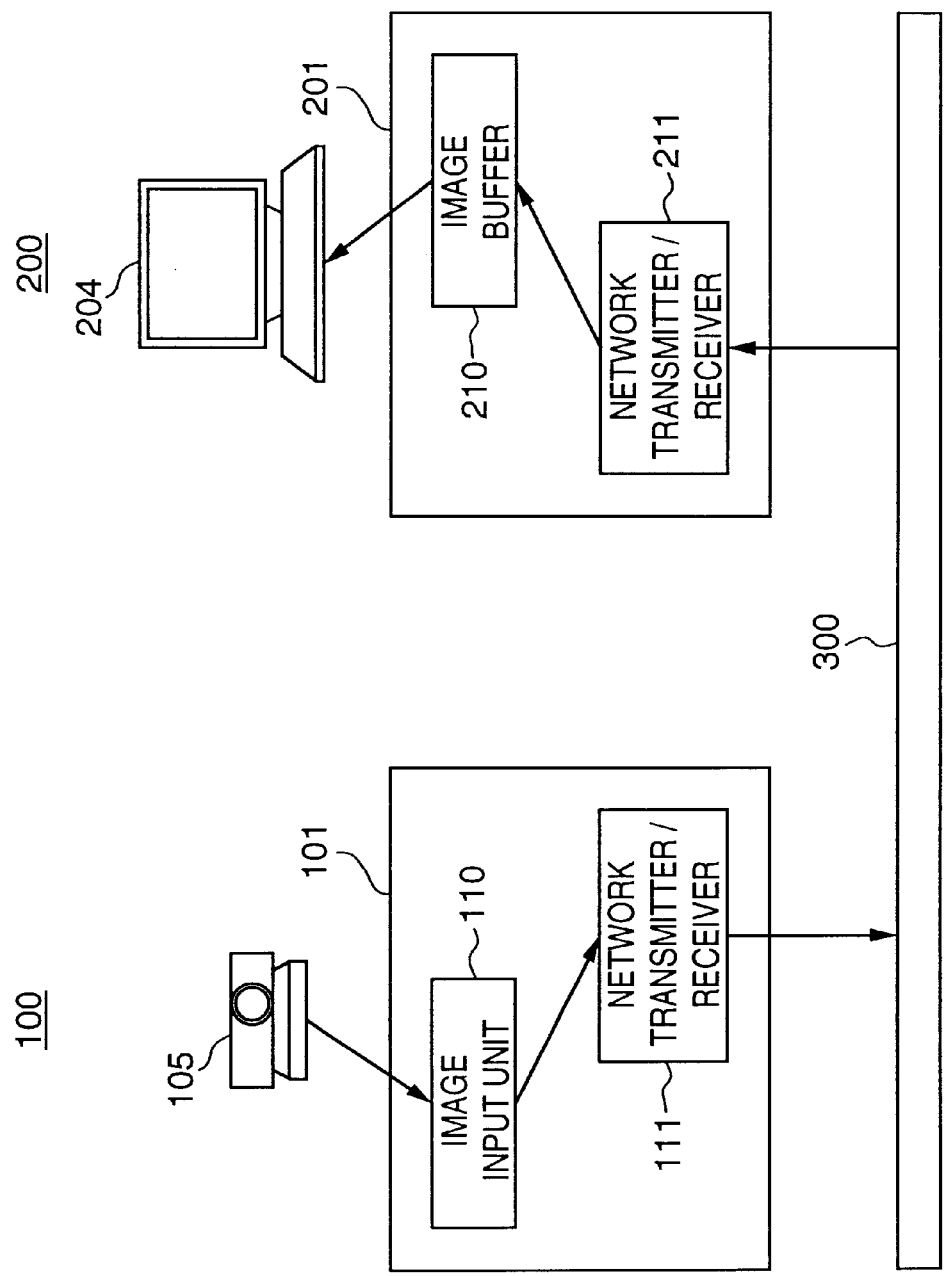
FIG. 2 is a schematic block diagram showing the arrangement of the general image communication system.
Figure 3:
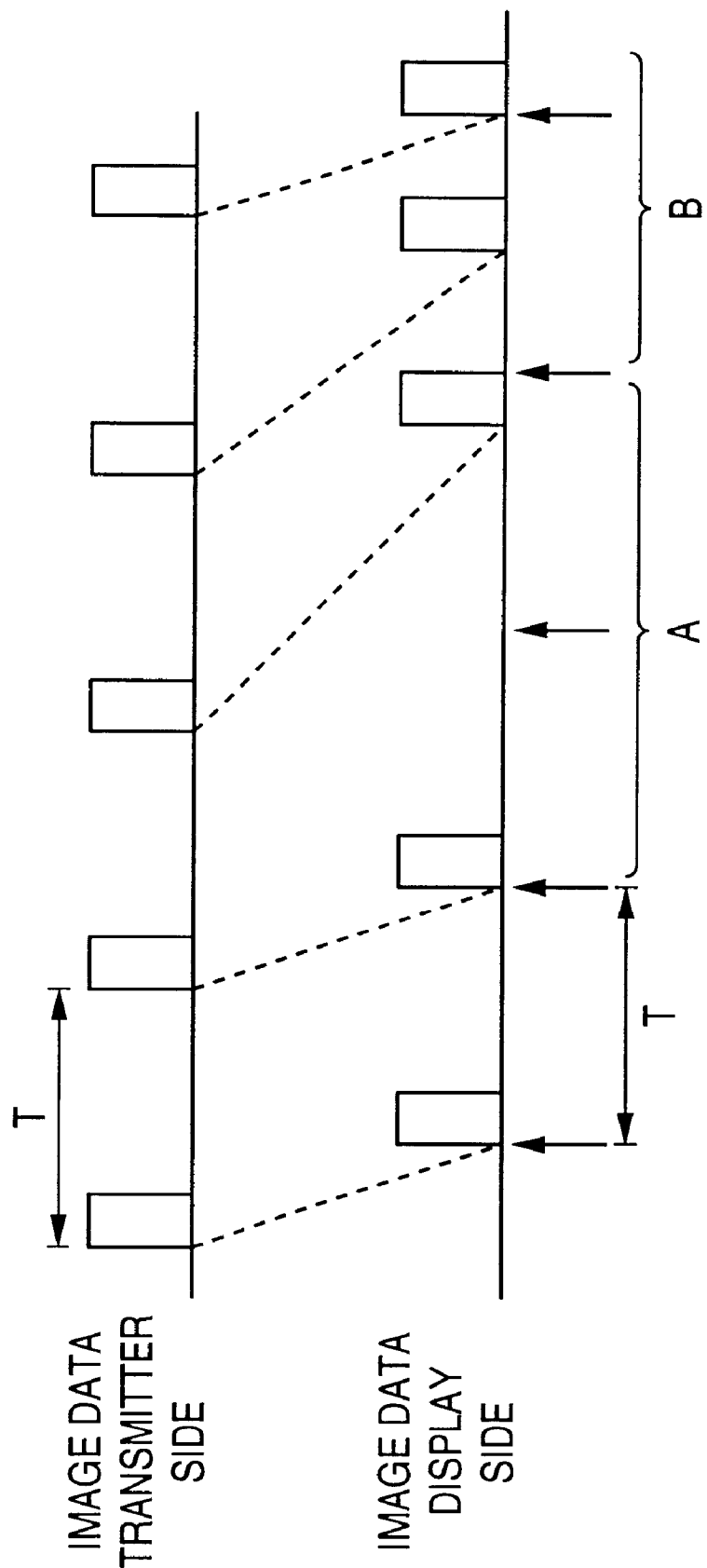
FIG. 3 is a chart for explaining jitter produced in communications on the network.
Figure 5:
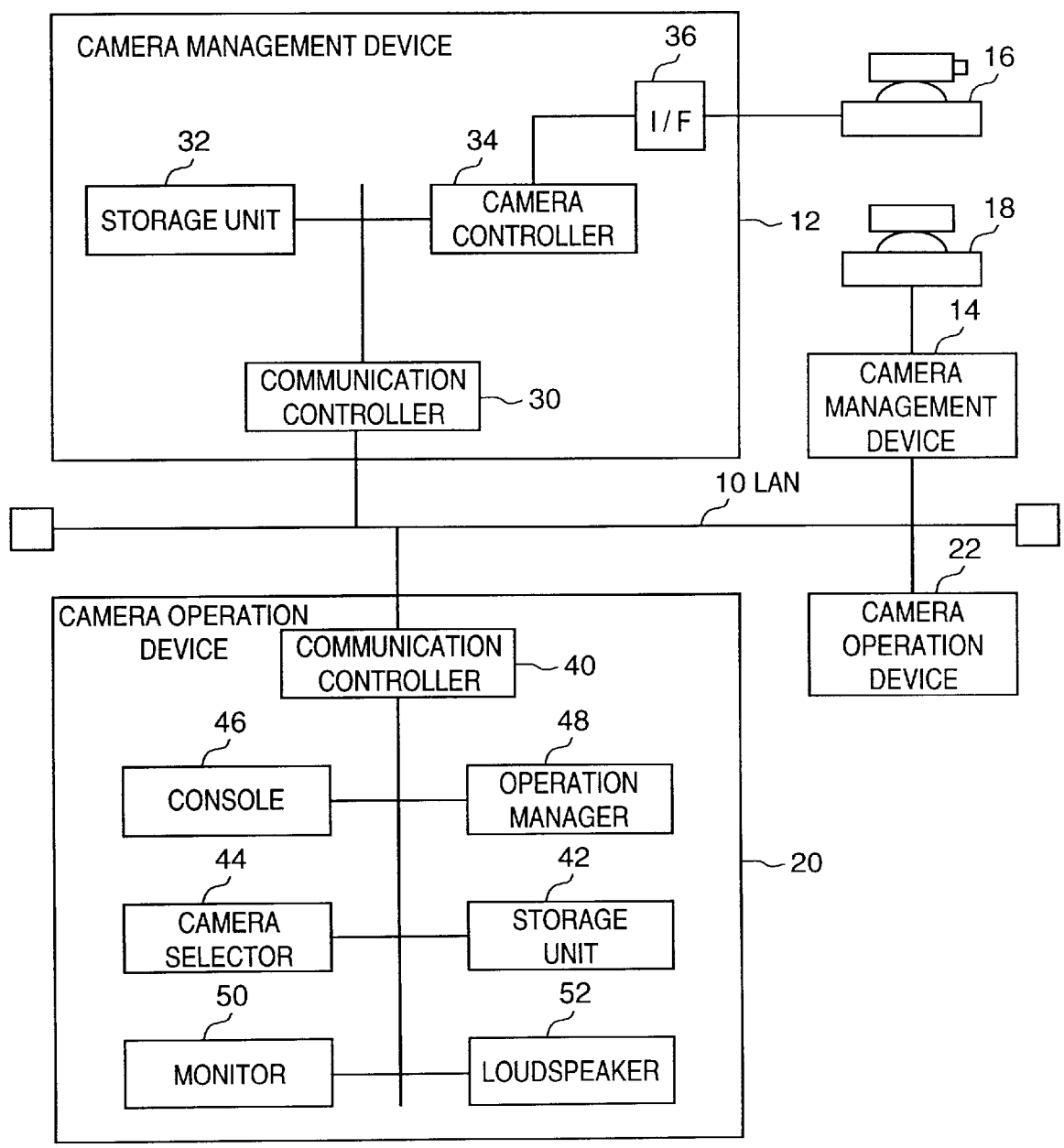
FIG. 5 is a block diagram showing the arrangement of an image communication system according to the first embodiment of the present invention.

FIG. 5 is a schematic block diagram showing the arrangement of an image communication system according to the first embodiment of the present invention. In this embodiment, camera management devices and camera operation devices (clients) are connected via a LAN but may be connected via a communication network such as the Internet.

Reference numeral 10 denotes a LAN adopting Ethernet (a LAN with a bus configuration developed by DEC Corp., Intel Corp., and Xerox Corp., USA), to which a plurality of camera management devices 12 and 14 are connected. The camera management devices 12 and 14 are respectively connected to video cameras (to be referred to as cameras hereinafter) 16 and 18. The cameras 16 and 18 may have microphones for inputting audio data. Furthermore, a plurality of camera operation devices 20 and 22 for remote-controlling the cameras 16 and 18 are connected to the LAN 10.

As will be described in detail later, the camera management device 12 or 14 controls the image sensing direction (at least one of pan and tilt directions) and zoom ratio of the camera 16 or 18 respectively, under its management in accordance with a camera control signal supplied from the camera operation device 20 or 22 via the LAN 10, and transmit a image signal obtained from the camera 16 or 18 to clients as the supply sources of the control signal via the LAN 10. Note that when these cameras 16 and 18 comprise microphones, audio information is also converted into predetermined data, which is transmitted to the corresponding client.

The camera management device 12 comprises a communication controller 30, a storage unit 32, a camera controller 34, and an interface 36. The communication controller 30 controls connections and data communications with an arbitrary camera operation device 20 or 22 via the LAN 10. The storage unit 32 comprises a memory such as a RAM, an HDD (hard disk drive), or the like, and stores various data including image and audio data to be transmitted. Also, the storage unit 32 stores position information of an object to sense a specific object. Note that this position information includes the image sensing direction and zoom ratio of the camera 16. The camera controller 34 controls the image sensing direction and zoom ratio of the camera 16 and supplies image and audio data from the camera 16 to the communication controller 30 via the storage unit 32. The interface (I/F) 36 is used for connecting the camera 16 to the camera controller 34. Note that the camera management device 14 also has the same arrangement as that of the camera management device 12.

On the other hand, the camera operation device 20 comprises a communication controller 40, a storage unit 42, a camera selector 44, a console 46, an operation manager 48, a display monitor (to be referred to as a monitor hereinafter) 50, and a loudspeaker 52. The communication controller 40 controls connections and data communications with an arbitrary camera management device 12 or 14 via the LAN 10. The storage unit 42 comprises a memory such as a RAM, an HDD (hard disk drive), or the like, and stores various data including image and audio data received via the LAN 10. The console 46 operates the pan and tilt angles and zoom ratio of one camera selected by the camera selector 44. The operation manager 48 manages selection by the camera selector 44 and user's operations at the console 46, and exchanges control information with the camera management device 12 or 14 that manages the camera to be controlled. The monitor 50 displays an image received from the camera management device via the LAN 10. The loudspeaker 52 acoustically outputs a voice received via the LAN 10.

Note that the camera operation device 22 has the same arrangement as that of the camera operation device 20. The camera operation devices 20 and 22 can substantially use personal computers, workstations, or the like, and the camera selector 44, console 46, and operation manager 48 are implemented by image elements or selection menus, and the like set on a graphical user interface (GUI), a pointing device such as a mouse for operating or selecting them, and a software program that displays the GUI and processes the operation or selection of the pointing device.

FIG. 5 illustrates two camera management devices 12 and 14 and two camera operation devices 20 and 22. As is apparent, three or more camera management devices can be connected to the LAN 10, and similarly, three or more camera operation devices to the LAN 10. In the following description, a case will be exemplified wherein the camera operation device 20 controls the camera 16 via the camera management device 12. Of course, the present invention can be applied to a case wherein the camera operation device 22 can control the camera via the camera management device 12 or 14.

Figure 6:
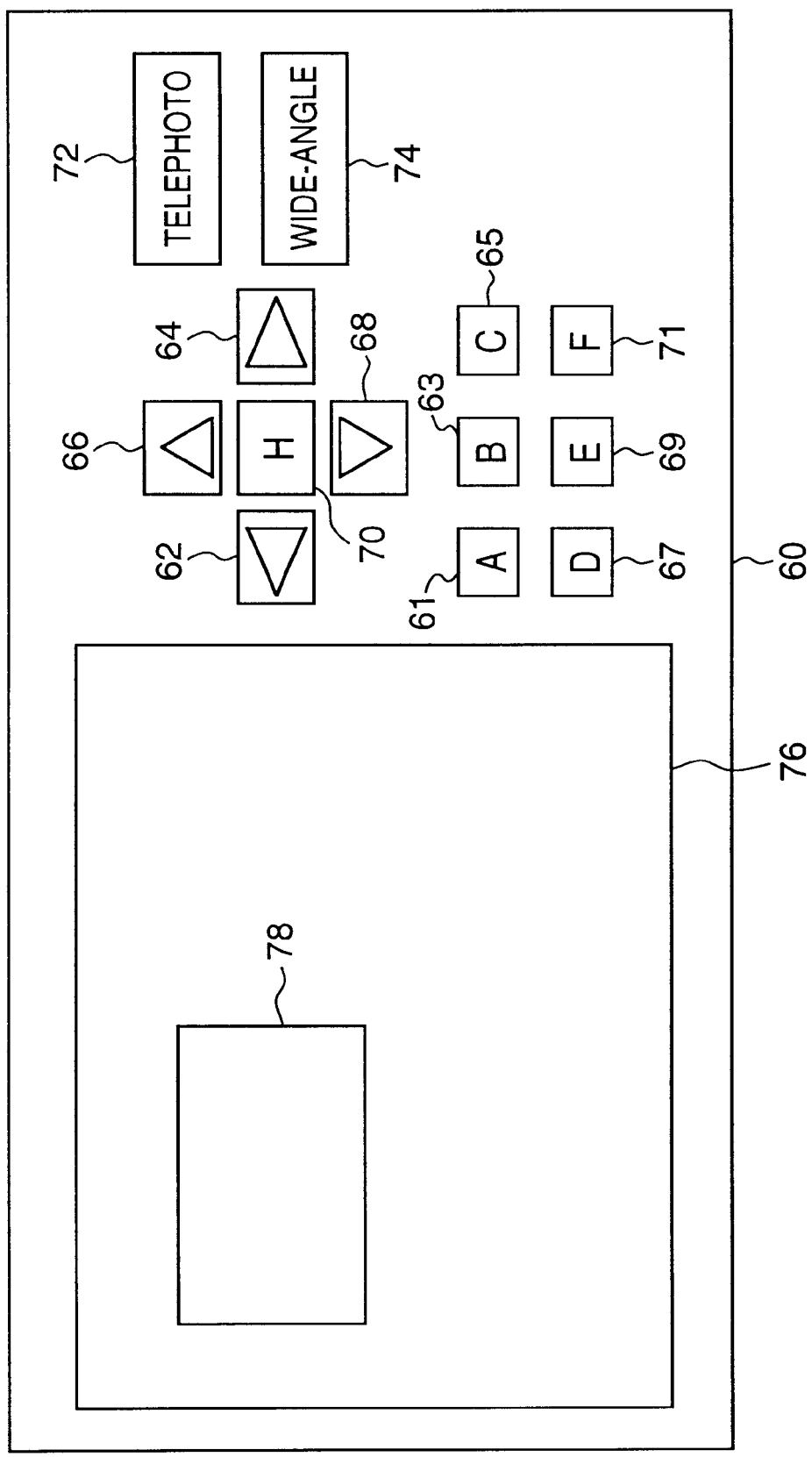
FIG. 6 is a view showing an example of a camera console window of the first embodiment.

FIG. 6 shows a camera console window 60 depicted as the console 46 in FIG. 5, and this camera console window 60 is displayed on the screen of the monitor 50. The camera console window 60 has pan buttons 62 and 64 for instructing the pan direction (horizontal direction) of the camera 16, tilt buttons 66 and 68 for instructing the tilt direction (vertical direction) of the camera 16, a home button 70 for returning the camera 16 to a predetermined front position, a telephoto button 72 for instructing the camera 16 to zoom in the telephoto direction, and a wide-angle button 74 for instructing the camera 16 to zoom in the wide-angle direction. Furthermore, the window 60 has buttons 61, 63, 65, 67, 69, and 71 for instructing the image sensing directions and zoom ratios of specific objects to be sensed by the camera 16. The buttons 61, 63, 65, 67, 69, and 71 respectively have independent image sensing directions and zoom ratios, and data associated with them are stored in the storage unit 32 of the camera management device 12.

A rectangular frame 78 indicates a view field range at the current pan angle, tilt angle, and zoom value of the camera 16, and a range 76 indicates the range (to be referred to as a potential view field range hereinafter) that allows image sensing when the pan and tilt angles are maximized while maintaining that zoom value.

Figure 7:
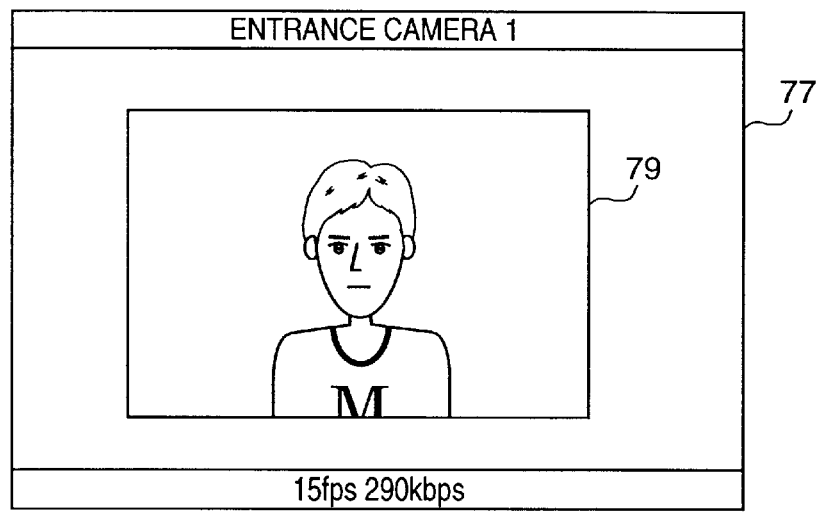
FIG. 7 is a view showing an example of an image display screen of the first embodiment.

FIG. 7 shows an image display window 77, which is displayed on the screen of the monitor 50 in addition to the camera console window 60 (FIG. 6). Within an image display frame 79 assured on the image display window 77, an image sensed by the camera 16 is displayed. The operator operates the camera 16 while checking the motion of the object by observing the image displayed on the image display frame 79. Note that the image display frame 79 may be assured within the rectangular frame 78 (FIG. 6).

On the image display window 77, "entrance camera 1" displayed on the upper portion indicates a camera which is currently sensing an image that is being displayed on the image display frame 79, i.e., the currently selected camera. Furthermore, "15 fps" displayed on the lower portion of the image display window 77 indicates the current frame rate, and is 15 frames/sec in the illustrated example. Also, "290 kbps" indicates the current data transmission rate, and is 290 kbits/sec in this case. Since these two pieces of information are displayed together, the user's operability can be improved.

Figure 8:
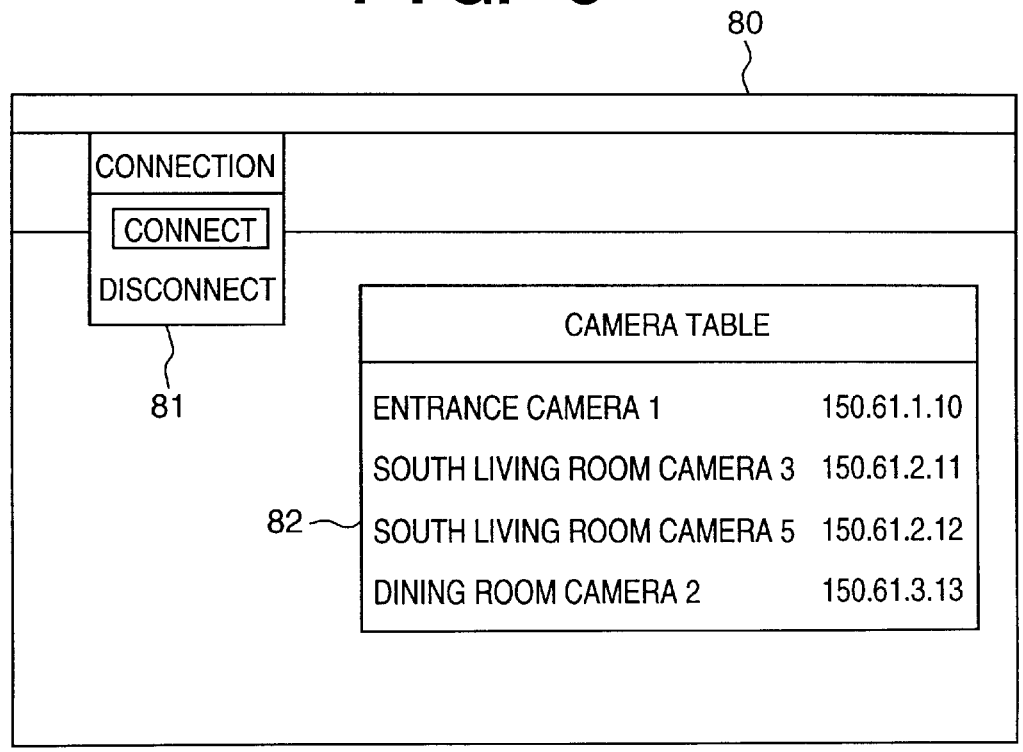
FIG. 8 is a view showing a camera table and a connection/disconnection menu in the first embodiment.

FIG. 8 shows a camera selection window 80 for selecting one of the cameras to be operated which are included in the camera selector 44 in FIG. 5, and are displayed. This window 80 is also displayed on the screen of the monitor 50. A "connect" pull-down menu 81 has items "connect" and "disconnect". Together with the display of the pull-down menu 81 upon selection of the "connect" menu or in accordance with the selection of a camera list display menu (not shown), a camera table 82 that shows a list of all the selectable cameras is displayed.

The camera table 82 holds a combination of names or the like that easily represent the individual camera positions ("entrance camera 1" is one of them), and identification information for uniquely identifying the camera management device 12 or 14. In the first embodiment, since the camera management devices 12 and 14 and the camera operation devices 20 and 22 are connected via an IP (Internet Protocol), an IP address is used as this identification information. The camera names and the IP addresses of the camera management devices (corresponding to the camera table 82 in FIG. 8) are pre-stored in the storage unit 42.

When a camera is selected from those displayed on the camera table 82, and item "connect" is selected from the "connect" pull-down menu 81, the selected camera can be controlled via the LAN 10 by the camera operation device 20, and an image sensed by the selected camera is displayed on the display frame 79 of the monitor 50.

When one already connected camera is selected from those displayed on the camera table 82, and item "disconnect" is selected from the "connect" pull-down menu 81, the right of access to that camera is released to another camera operation device, and an image sensed by that camera ceases to be displayed on the monitor 50.

Note that a plurality of camera operation devices may try to control a camera connected to one camera management device. In such case, the right of access is granted to only the camera operation device which was connected earliest. Note that the right of access is not granted to other camera operation devices, but the image sensed by that camera can be observed at these devices. Since other camera operation devices have no right of access to that camera, various operation buttons shown in FIG. 6 are displayed at, e.g., a low density, to indicate an inactive state, and even if the user tries to operate them, the operations are ignored. If the user of the camera operation device with the right of access disconnects that camera, the right of access is granted to another camera operation device which has not been granted the right of access so far, and the above-mentioned buttons are displayed on the monitor of the camera operation device which is newly granted the right of access in an active state. The order of granting the right of access of the camera corresponds to the order of connections to the camera management device connected to the camera.

A case will be exemplified below wherein the camera operation device 20 receives and displays an image from the camera 16 connected to the camera management device 12.

Figure 9:
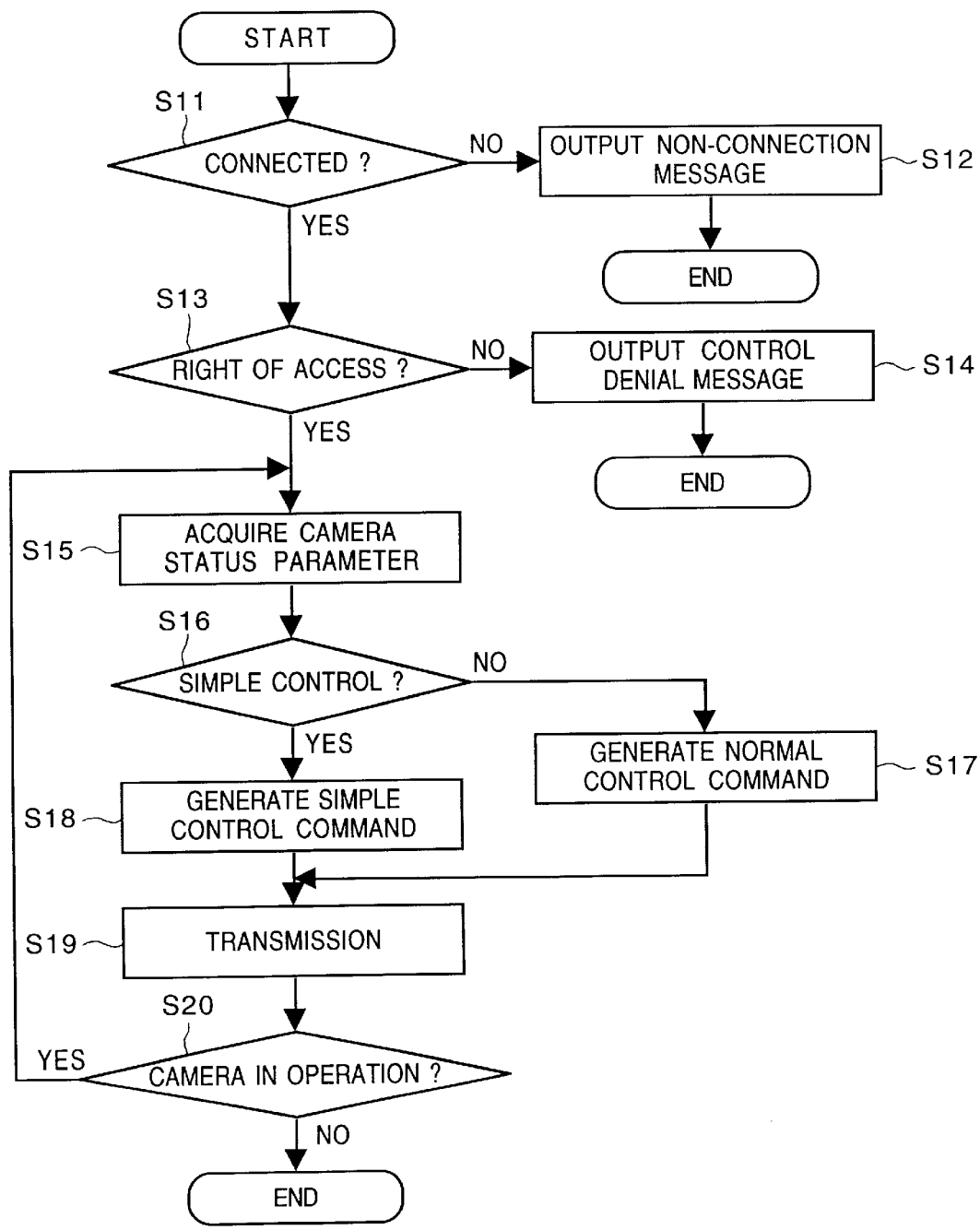
FIG. 9 is a flow chart showing the operation processing contents of a camera operation of a camera operation device of the first embodiment.

FIG. 9 is a flow chart showing the processing at the camera operation device 20 of the first embodiment.

As described above, since the hardware portion of the camera operation device 20 comprises a normally used personal computer or workstation, the console 46, the camera selector 44, and the operation manager 48 are implemented by a CPU of the device, and their operation program is loaded from an external storage device (not shown) onto a main memory. The following description will explain the processing after the camera operation program has already been read out and executed.

The operator clicks one of the operation buttons 61 to 74 on the camera console window 60 (FIG. 6) using a pointing device (not shown). The operation manager 48 (FIG. 5) detects the already connected camera (step S11), and if none of cameras are connected, the flow advances to step S12 to display a message (non-connection message) on the monitor 50, thus ending this processing.

On the other hand, if the camera operation device is already connected to one of the camera management devices (in this case, the camera management device 12), the flow advances to step S13 to check if the right of access has been granted by the connected camera management device 12. If NO in step S13, the flow advances to step S14 to display a message (control denial message), thus ending this processing.

If it is determined that the camera operation device is already connected to the camera management device 12 and has been granted the right of access, the flow advances to step S15 to acquire the clicked button status.

In the following description, the operation at the button 62, 64, 66, 68, 70, 72, or 74 in FIG. 6 will be referred to as normal control, and the operation at the button 62, 63, 65, 67, 69, or 71 will be referred to as simple control.

It is checked in step S16 if clicking instructs the normal or simple control.

If the normal control is instructed, the flow advances to step S17. In this case, for example, when the instruction button 64 for increasing the pan angle is operated, a control command for increasing the pan angle is generated.

On the other hand, if the simple control (input at the button 61, 63, 65, 67, 69, or 71) is instructed, the flow advances to step S18, and a control command having identification information of the instructed button is generated.

After the control command is generated, the flow advances to step S19 to transmit the generated control command to the connected camera management device 12.

It is checked in step S20 if the camera is in operation. If the camera 16 is in operation (this means that one of various buttons is kept pressed), the flow returns to step S15 to repeat the above-mentioned processing.

Figure 10:
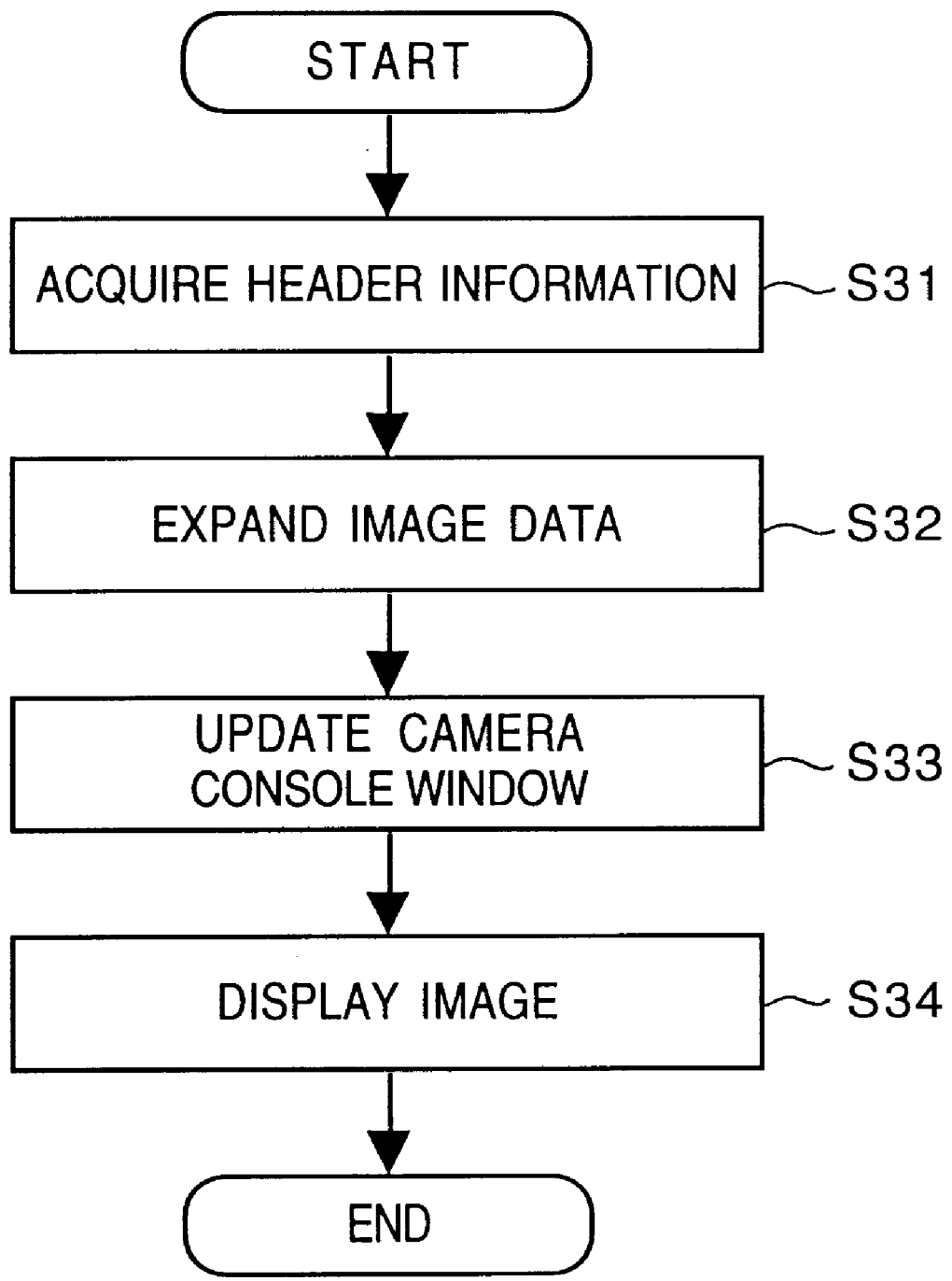
FIG. 10 is a flow chart showing the reception processing contents of image data in the camera operation device of the first embodiment.

FIG. 10 shows the sequence of the program executed by the CPU of the camera operation device 20 upon reception of image data from the camera management device 12.

Upon reception of image data, header information of the received data is acquired in step S31, and the following image data is received and expanded in step S32. The flow then advances to step S33, and the position and size of the frame 78 in FIG. 6 are updated on the basis of angle information (pan and tilt angles and zoom value) included in the acquired header information Thereafter, the expanded image data is displayed within the image display frame 79 shown in FIG. 7 in step S34.

Since the camera console window 60 is updated in step S33, the camera console window 60 to be displayed on the camera operation device with no right of access can be matched with that displayed on the camera operation device with the right of access.

Figure 11:
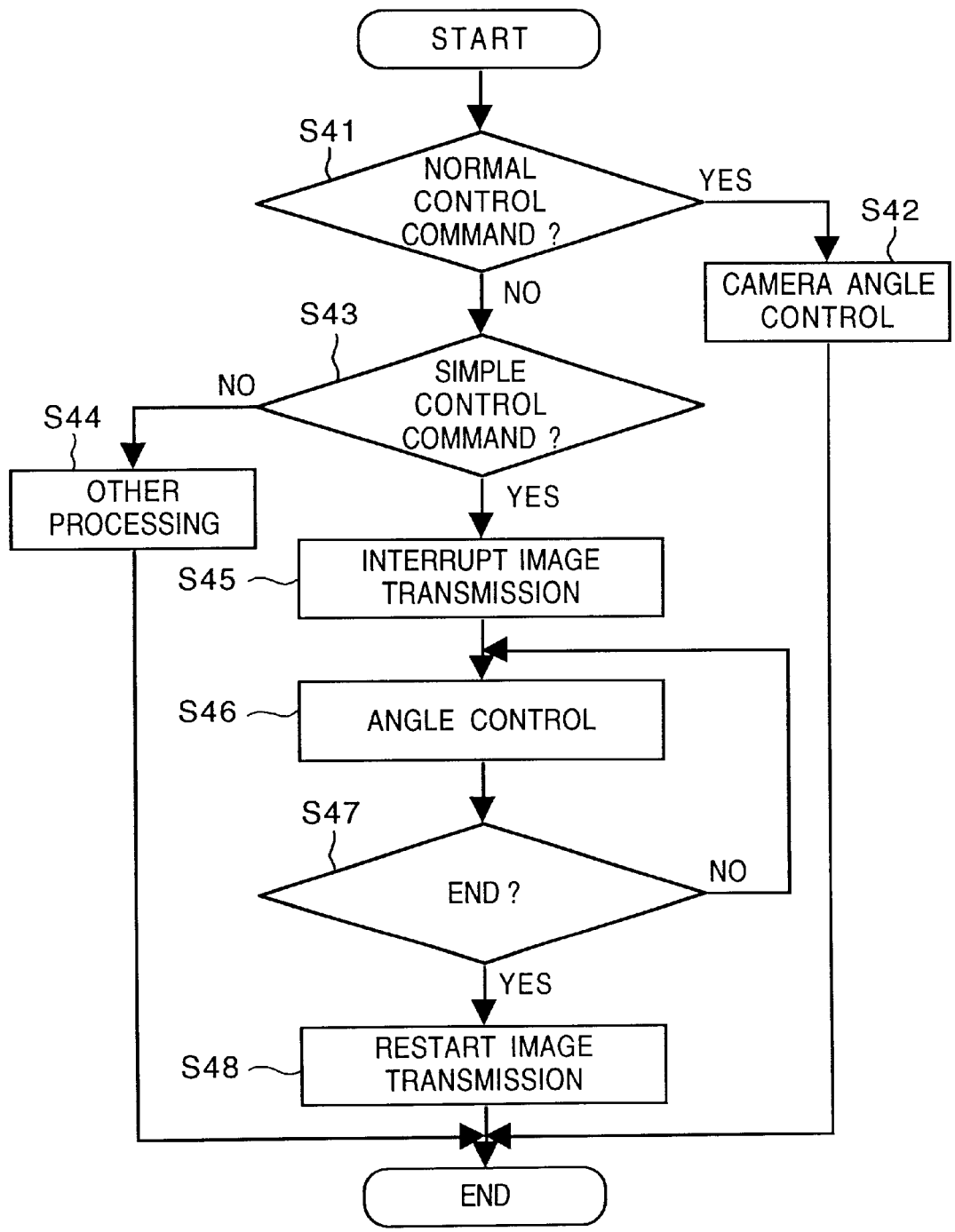
FIG. 11 is a flow chart showing the operation processing contents of a camera management device in the first embodiment.

The operation processing sequence in the camera management device 12 of this embodiment will be described below with reference to the flow chart in FIG. 11. Note that the program corresponding to this flow chart, of course, is stored in a predetermined storage medium of the camera management device 12, and is executed by the CPU (not shown). On the other hand, login processing from the camera operation device, granting of the right of access, and the like are attained by another processing, and only the operation control of the panning and tilt angles, zoom value, and the like of the camera will be described hereinafter.

In step S41, it is checked if the received command is a normal control command. If YES in step S41, the flow advances to step S42 to control the pan or tilt angle or zoom value in accordance with the instructed angle information, thus ending this processing. Note that processing for adding the above-mentioned header information to image data input by the camera 16 in another task and transmitting the data to the connected camera operation device 20 is executed during this interval.

If it is determined in step S41 that the received command is not a normal control command, the flow advances to step S43 to check if the received command is a simple control command. If NO in step S43, the flow advances to step S44 to execute the corresponding processing.

On the other hand, if YES in step S43, the flow advances to step S45 to temporarily interrupt transmission processing of image data input by the camera 16 to the camera operation device 20 (also interrupt transmission of audio data obtained by the microphone if the microphone is connected to the camera 16). In step S46, the corresponding pan and tilt angles and zoom value are read out from the storage unit 32 on the basis of the identification information of the simple control instructed by the received simple control command, and the camera 16 is controlled to have the camera angle defined by these parameters.

In the method of controlling the camera 16, the camera 16 is instructed via the camera I/F 36 to have the target pan and tilt angles and zoom ratio, and the current position information (the current pan and tilt angles and zoom ratio) of the camera 16 is read from the camera 16 via the I/F 36 and compared with the target values. If the difference between the current position information and the target position information becomes smaller than a given value, it is determined that the target angle has been reached. Also, the camera 16 may return a return value indicating an end of the position control.

If it is determined in step S47 that the target angle has been reached, the flow advances to step S48 to restart transmission of video data (including audio data), thus ending this processing.

In the above-mentioned processing, if the normal control command is received, even when the camera operation device 20 instructs to continuously change the pan angle, the camera operation device 20 executes processing for transmitting normal commands to the camera management device 12 at appropriate timings, and receiving image data based on the transmitted commands. On the other hand, the camera management device 12 controls the position of the camera 16 based on the instructed direction or zoom value every time it receives a command.

On the contrary, when the camera management device 12 receives the simple control command, image data ceases to be transmitted (image sensing itself may be disabled) until the target angle has been reached. Hence, the camera can reach the target angle at high speed.

As described above, according to the first embodiment, when the camera operation device inputs an angle change instruction using the pan or tilt angle or the zoom value, it can execute a mode of displaying an image in real time in accordance with the instruction, or a mode of nonstop-moving the camera angle to the target position at high speed and interrupting image transmission during that movement, thus improving the operability upon connecting the accustomed camera management device. Also, since substantially no image data is transmitted from the camera management device onto the network until the target angle is reached in the camera, the load on the accesses of other network users can be reduced.

In the first embodiment, upon reception of the simple control command, image data transmission is interrupted until the target angle is reached in the camera. Alternatively, the data volume of the image data may be reduced (by increasing the compression ratio). In this case, the data volume can be reduced to some extent until the target angle is reached, but cannot become substantially zero unlike the above embodiment.

In this embodiment, the camera server, i.e., the camera management device has the pan and tilt angles and zoom values upon transmission of the simple control command. However, these values may be freely set at the client side, i.e., the camera operation device side, and may be held. If the client has such information, when, for example, a simple control pull-down menu or the like may be displayed, and one of items is selected from the displayed menu, a command with an appropriate format (of course, a format that can be distinguished from the normal control command) may be generated and transmitted to the camera server. In this case, the camera server may check the format of the received command to determine if the received command is the normal or simple control command, and may execute the above-mentioned processing in correspondence with the received command.

When the client side has angle information used for the simple control command, the angles to be controlled can be standardized in other camera servers, and need not be stored in units of camera servers.

Independently of the storage position (the camera server or client) of the angle information for the simple control, the operator at the client side preferably can confirm the camera angle set.

For example, the operator can confirm the angles to be set by the buttons 61, 63, . . . in FIG. 6 when he or she actually operates these buttons, but does not know the angles corresponding to these buttons when he or she has established a connection for the first time. In some cases, the operator may forget the angles actually set.

In view of this problem, when the camera server has angle information associated with the simple control, a button for instructing to transmit the registered angle information may be arranged, and upon operation of this button, a command indicating it is transmitted. Upon reception of this command, the camera server transmits the registered angle information in units of buttons to the client side in step S44 in FIG. 11. Alternatively, the camera server transmits images drawn with frames based on the angle information.

Figure 12:
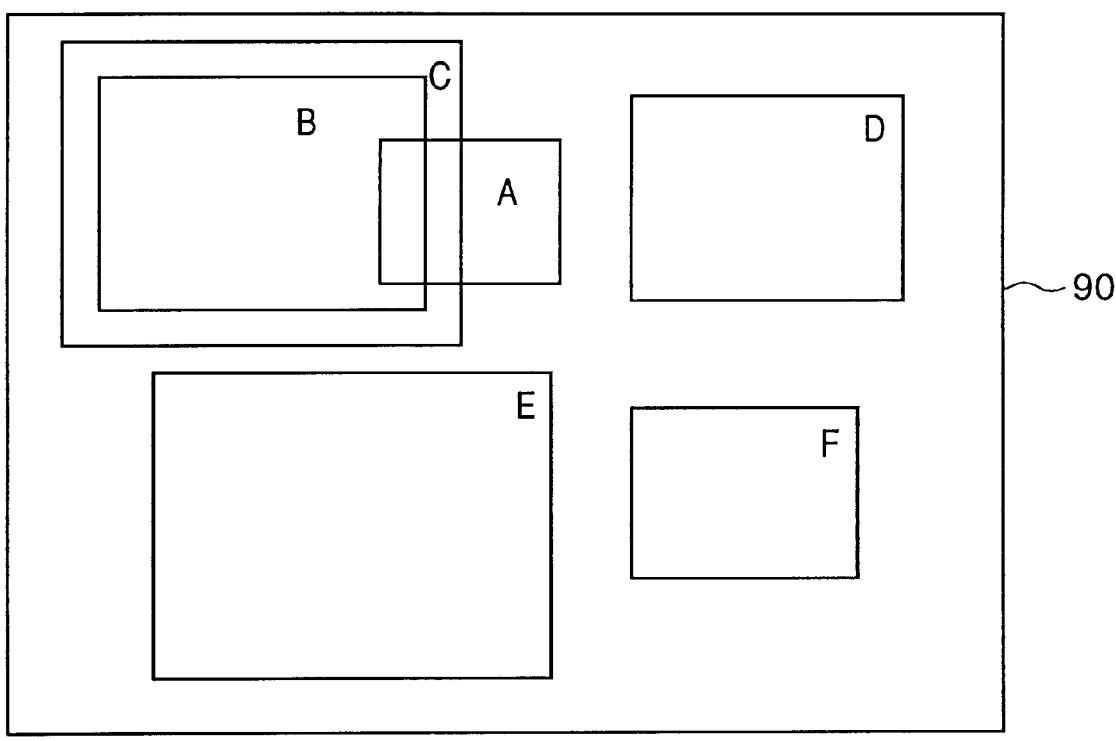
FIG. 12 is a view showing display examples of the individual angles in simple angle movement in the first embodiment.

As a result, the client side displays windows shown in FIG. 12, so that the operator at the client can recognize the angles corresponding to the buttons. Note that reference numeral 90 in FIG. 12 denotes a potential view field range when panning and tilting are repeated while fixing the zoom ratio of the camera at the wide-angle end.

On the other hand, when the client has the angle information, the registered information may be read out from the storage unit upon reception of a display instruction of the angle information, and the windows shown in FIG. 12 may be displayed based on the readout information.

In either case, when the windows shown in FIG. 12 are displayed, the individual angles can be preferably edited using an appropriate editor. When the camera server stores data for the simple control, the client transmits the edit result to the camera server by generating a command with an appropriate format. Upon reception of the command, the camera server may update its internal data.

On the other hand, when the client stores data for the simple control, it can directly update the stored data.

Note that the first embodiment has exemplified a relatively small-scale network, but may be applied to the Internet that has been receiving a lot of attention recently. In this case, remote cameras set at, e.g., tourist spots (of course, those at foreign countries) can be controlled, and the operator can observe an image of a desired spot at his or her home. When this embodiment is applied to the Internet, since many and unspecified clients are connected, the simple control camera angle on each camera server is preferably inhibited from being changed or a permission for changing the angle may be granted to only a specific privileged user.

When this embodiment is implemented on the Internet, and when a given client is connected to a target camera server and issues a proper registration instruction (assigned to, e.g., a pull-down menu) to be easily connected to that camera server again, the identification information of the camera server connected at that time may be registered in the camera table (see FIG. 8).

When this embodiment is applied to the Internet, since the client side runs a browser program, if the window shown in FIG. 6 corresponds to this browser window, the simple control buttons 61, 63, . . . , are defined by hypertexts sent from the camera server side. That is, the display of the window shown in FIG. 6 indicates that the camera server side has information associated with the simple control command, and the browser need only inform the camera server of the operated button. If the client side has data for the simple control, the browser adopts, e.g., a pull-down menu.

The first embodiment has exemplified a case wherein the LAN is built using the Ethernet, but can also be applied to the Internet, as described above. In this case, the camera servers and clients may be connected via an ISDN or public telephone network. When the client is connected to a specific camera server via the ISDN or public telephone network, telephone numbers can be used as information for uniquely identifying the camera management devices (camera servers) 12 and 14.

Furthermore, the camera operation device in the first embodiment is realized by a normally used personal computer or workstation. Also, the camera management device can be made up of a similar arrangement, needless to say.

Figure 13:
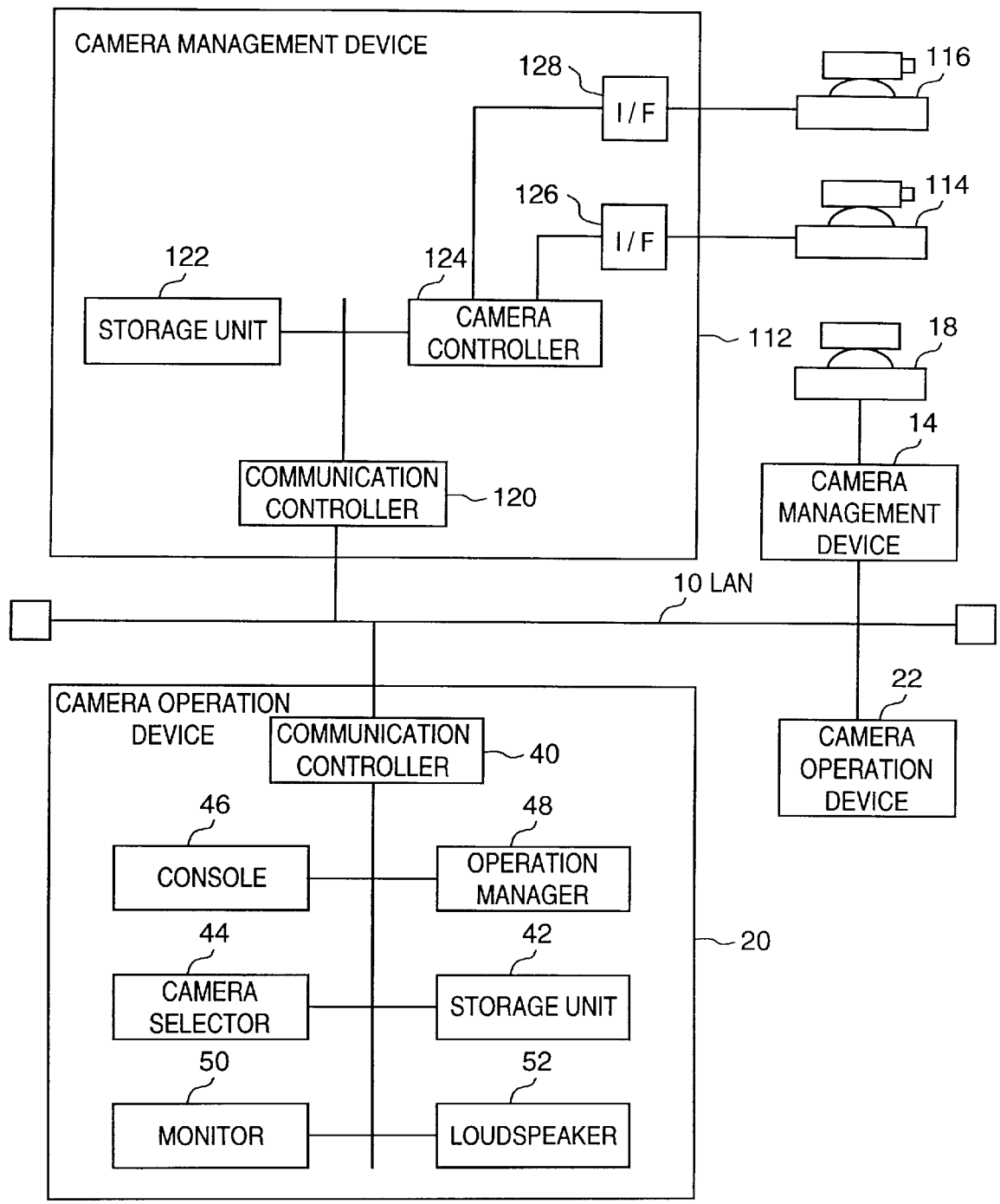
FIG. 13 is a block diagram showing a modification of the system of the first embodiment.

FIG. 13 is a schematic block diagram showing the modification of the first embodiment. A camera management device 112 is connected to the LAN 10, and manages two cameras 114 and 116. The camera management device 112 comprises a communication controller 120 and a storage unit 122, similar to the communication controller 30 and the storage unit 32 respectively, and further comprises a camera controller 124 capable of controlling the two or more cameras, and camera interfaces 126 and 128 connected to the camera controller 124, each of which is connected to the camera 114 or 116. The same reference numerals in FIG. 13 denote the same parts as in FIG. 5.

When the single camera management device 112 manages a plurality of cameras 114 and 116, the camera to be operated can be specified by adding information for specifying one of the cameras 114 and 116 managed by the camera management device 112 in addition to that for specifying the camera management device 112.

Of course, when the communication controller 120 of the camera management device 112 can set logic communication channels corresponding in number to the cameras 114 and 116 to be managed, connection requests for different cameras from a plurality of camera operation devices 20 and 22 can be simultaneously processed.

Similarly, it is easy to extend the functions of the camera operation devices 20 and 22 to be able to operate a plurality of cameras at the same time.

In this embodiment, the camera server is built by the camera management device and the camera connected thereto, but may be realized by a single device.

As described above, according to the first embodiment, when the view field angle of a remote camera is to be changed, the time required for setting the target angle can be shortened by suppressing the transmission volume of image data until the target angle is reached in the camera, and the load on the network can be reduced by suppressing the image data volume to be transmitted until the target angle is reached in the camera.

[Second Embodiment]

Figure 14:
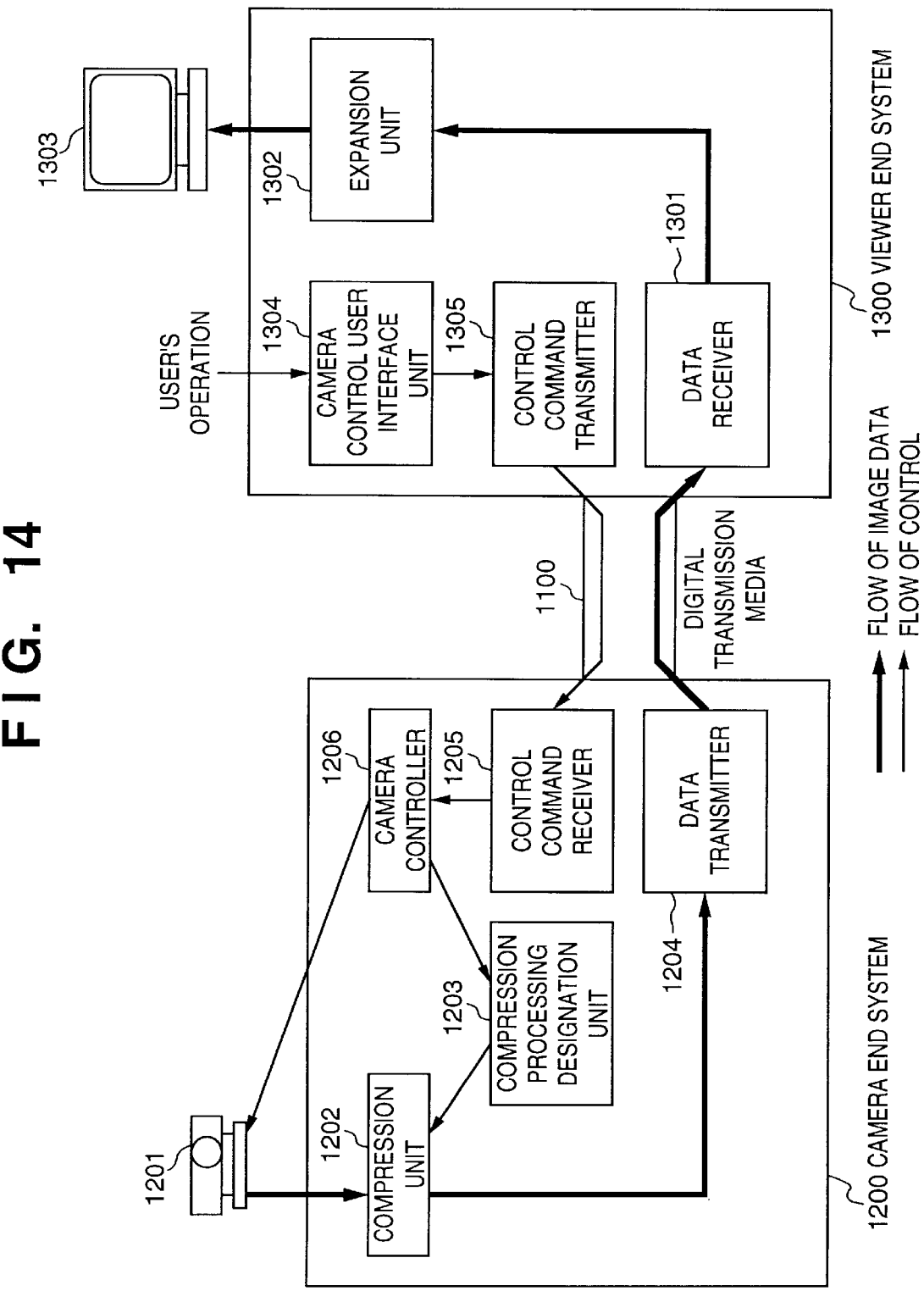
FIG. 14 is a block diagram showing the arrangement of an image transmission system according to the second embodiment of the present invention.

FIG. 14 is a block diagram for explaining the arrangement of an image communication system including an image transmission apparatus according to the second embodiment of the present invention.

In FIG. 14, reference numeral 1100 denotes digital transmission media such as a LAN, Internet, ISDN, or the like; and 1200, a camera end system (corresponding to the above-mentioned camera management device), which senses an image of the object to be sensed by controlling a camera device 1201 and transmits the sensed image data via the digital transmission medial 1100. Reference numeral 1300 denotes a viewer end system corresponding to the above-mentioned camera operation device (client), which receives image data sent from the camera end system 1200 via the digital transmission media 1100, and displays the received data on a display 1303. The camera device 1201 allows camera control of, e.g., the pan and tilt angles and zoom value.

The arrangement of the camera end system 1200 will be described below. Reference numeral 1202 denotes a compression unit, which compresses image data sensed by the camera device 1201, and outputs the compressed digital image data. Reference numeral 1203 denotes a compression processing designation unit for designating the compression mode used by the compression unit 1202 upon compressing image data. Reference numeral 1204 denotes a data transmitter which transmits the image data compressed by the compression unit 1202 to the viewer end system 1300 via the digital transmission media 1100. Reference numeral 1205 denotes a control command receiver which receives a camera control command sent from the viewer end system 1300. Reference numeral 1206 denotes a camera controller which interprets the control command received by the control command receiver 1205, and controls the operation of the camera device 1201 in accordance with the control command.

The arrangement of the viewer end system 1300 will be described below.

Reference numeral 1301 denotes a data receiver, which receives the compressed image data sent from the camera end system 1200 via the digital transmission media 1100. Reference numeral 1302 denotes an expansion unit which expands the compressed image data received by the data receiver 1301. Reference numeral 1303 denotes a display device which receives and displays the image data expanded by the expansion unit 1302. Reference numeral 1304 denotes a camera control user interface unit, which interprets user's camera operation, and converts it into an internal camera control command. Reference numeral 1305 denotes a control command transmitter for transmitting the camera control command to the camera end system 1200 via the digital transmission medial 1100.

Figure 15:
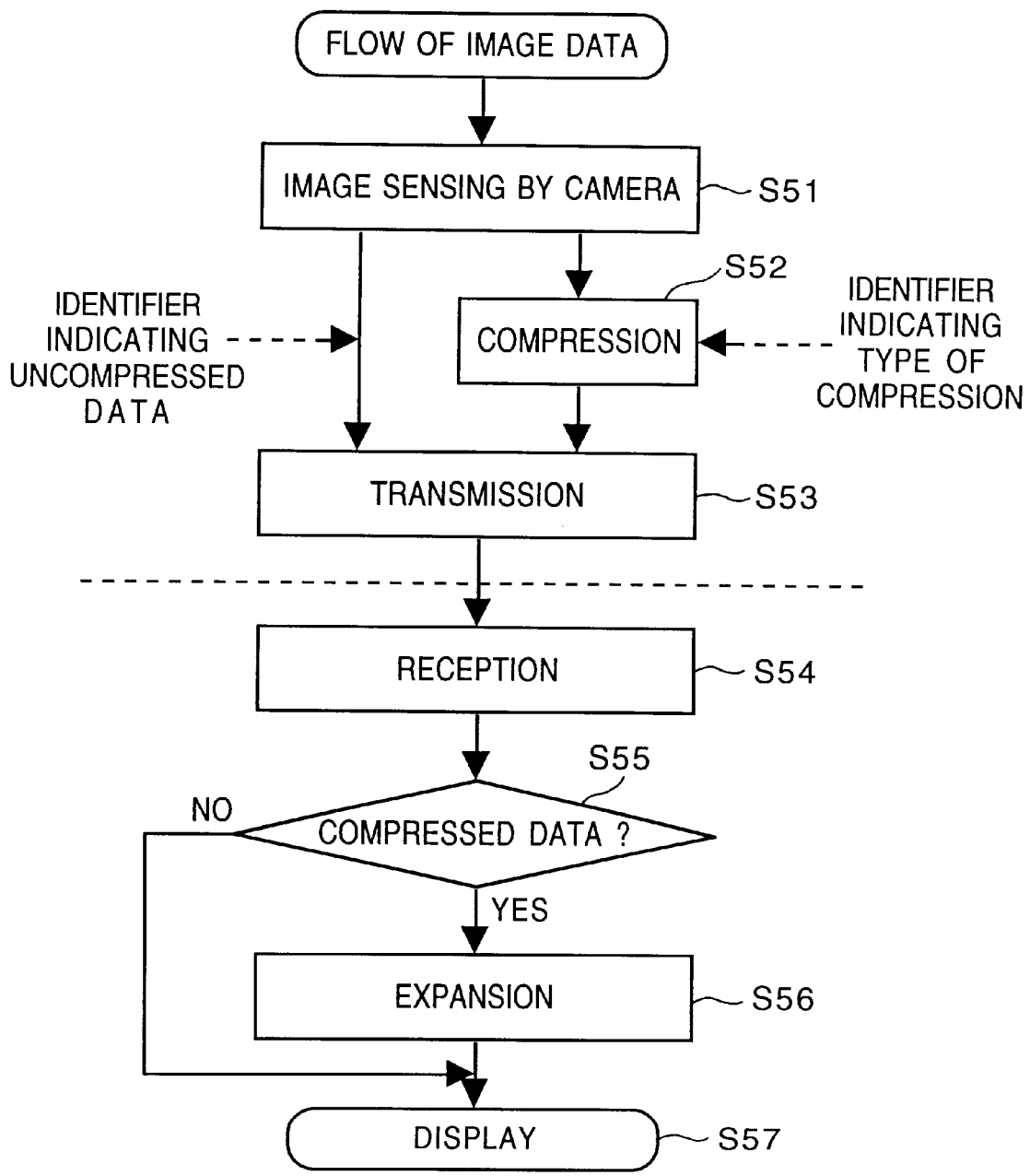
FIG. 15 is a flow chart showing the flow of image data in the image transmission system of the second embodiment.

The flow of image data sensed by the camera device 1201 will be described below with reference to FIG. 15.

In step S51, image signals sensed by the camera device 1201 are sequentially supplied to the compression unit 1202 as image data. In this case, although the image data may be either an analog signal or digital signal and may be divisionally sent in units of frames or sent as a bit stream, the image data is preferably sent in a format that can be easily processed by the compression unit 1202. The compression unit 1202 compresses image data by the processing method designated by the compression processing designation unit 1203. The operation of the compression processing designation unit 1203 will be described later.

The compression unit 1202 is prepared with a mechanism (function) that can select whether or not the compression processing is performed, as shown in step S52, or can selectively execute two different types of compression processing, i.e., the processing that assures a high resolution but a low compression ratio of an image, and the processing that assures a low resolution but a high compression ratio of an image. In order to realize the two types of compression processing, for example, two different compression schemes (e.g., Motion JPEG and MPEG-1, or the like) may be prepared, or a single compression scheme may be used by changing the compression parameter (e.g., changing the quantization step in MPEG-1). An identifier that can identify upon expansion processing whether or not the image data is subjected to the compression processing (with or without compression), or an identifier (indicating the type of compression) that allows to execute expansion processing in correspondence with changes in compression processing is added to the image data compressed by the compression unit 1202. Note that the compression unit 1202 may be implemented by either hardware or software.

The image data compressed by the compression unit 1202 is transmitted by the data transmitter 1204 to the viewer end system 1300 via the digital transmission media 1100 (S53). A protocol suitable for the specifications of the digital transmission media used is preferably used upon transmission of the image data. In general, when image data is transmitted, a data gram method with a small transmission overhead is used. For example, in the case of a computer network such as a LAN, Internet, or the like, UDP with a smaller overhead than TCP is normally used.

The compressed image data transmitted via the digital transmission media 1100 is received by the data receiver 1301 (S54). The received image data is further supplied to the expansion unit 1302. If it is determined based on the identifier added to the image data if the data is compressed (S55), the compressed image data is expanded by an expansion method corresponding to the compression method (S56). The expansion unit 1302 does not execute any expansion processing is if it detects based on the identifier that the data is not compressed. Also, assume that the expansion unit 1302 has an expansion processing function corresponding to all the kinds of expansion processing of the compression unit 1202 in the camera end system 1200. The image data which is expanded by the expansion unit 1302 or the uncompressed image data is output to and displayed on the display device 1303 (S57).

Figure 16:
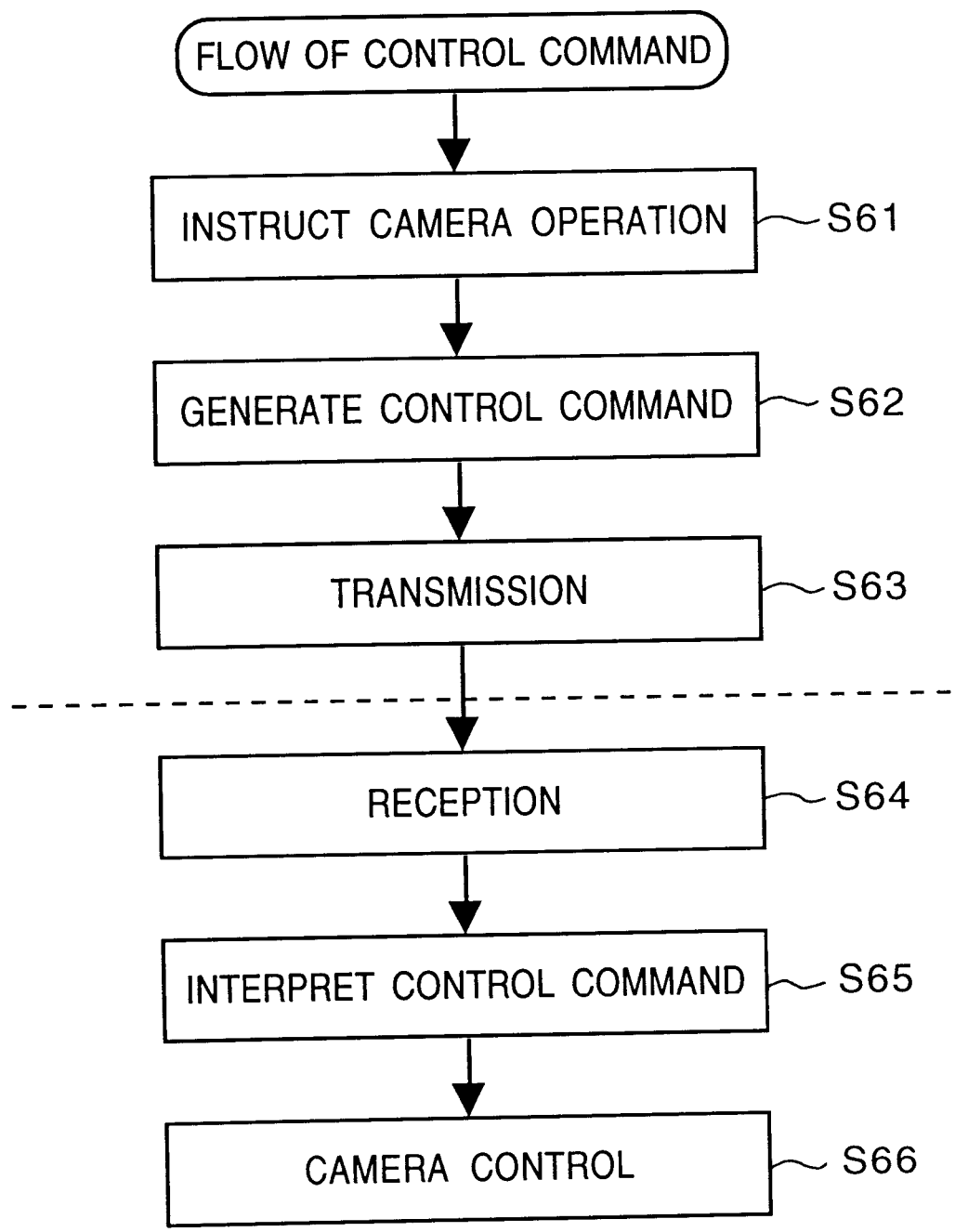
FIG. 16 is a chart showing the flow of control commands in the image transmission system of the second embodiment.

The flow of processing executed when the user makes camera control using the viewer end system 1300 will be explained below with reference to FIG. 16.

The user starts a camera control operation via the camera control user interface unit 1304 (S61). The camera control user interface unit 1304 may allow the pan, tilt, and zoom operations by operating mechanical switches or may be implemented by a graphical user interface on a computer and by operating control bars displayed on, e.g., the display device 1303 using, e.g., a mouse cursor. The user can control the operation of the camera device 1201 via the camera control user interface unit 1304 while observing an image that changes in correspondence with the camera operation.

The camera control user interface unit 1304 converts a camera operation input by the user's operation into a control command (S62), and sends that control command to the control command transmitter 1305. The control command may include commands "start clockwise rotation", "start counterclockwise rotation", and "stop rotation", or commands "rotate 30° clockwise", "rotate 30° counterclockwise", and the like. In order to identify such control commands, unique numerical values are assigned to the individual commands. For example, the command "rotate 30° clockwise" may be expressed by a combination of a command "rotate clockwise" and a parameter "30°". In the second embodiment, the command expression method is not specifically limited.

The control command transmitter 1305 transmits the control command received from the camera control user interface unit 1304 to the camera end system 1200 via the digital transmission media 1100 (S63). Since a reliable communication protocol is suitable for transmitting the control command unlike image data, for example, a protocol call TCP is preferably used in the case of a computer network such as a LAN, Internet, or the like.

The transmitted control command is received by the control command receiver 1205 of the camera end system 1200 (S64). The control command receiver 1205 sends the received control command to the camera controller 1206. The camera controller 1206 interprets the control command sent from the control command receiver 1205 (S65), and controls the camera device 1201 in accordance with the instruction of the control command (S66).

Figure 17:
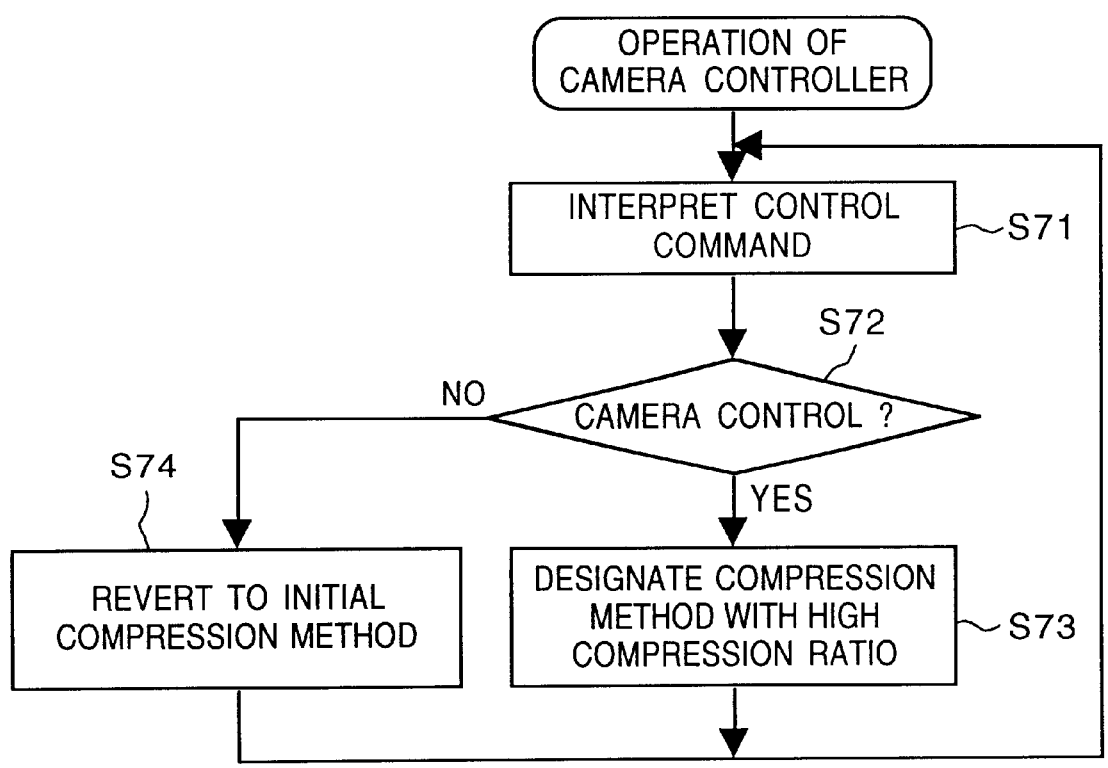
FIG. 17 is a flow chart showing the processing of a camera controller of the image transmission system of the second embodiment.

The operation of the camera controller 1206 will be described in detail below with reference to the flow chart in FIG. 17.

When the camera controller 1206 interprets the control command sent from the control command receiver 1205 in step S71, and starts camera control in accordance with the command (S72), it informs the compression processing designation unit 1203 that the camera control is in progress. Upon completion of the camera control, the controller 1206 informs the compression processing designation unit 1203 to that effect. With this information, the compression processing designation unit 1203 detects whether or not the camera control is in progress, and designates the compression processing method to the compression unit 1202 in accordance with the detection result.

That is, in a normal state in which no camera control is done, the flow advances from step S72 to step S74, and the compression processing designation unit 1203 instructs the compression unit 1202 to do compression processing by a compression method initially set by the camera end system 1200 or the user (or to revert to the initial compression method). On the other hand, if it is detected that the camera control is in progress, the flow advances form step S72 to step S73, and if the compression processing has not been performed so far, the compression processing designation unit 1203 instructs the compression unit 1202 to start compression processing. On the other hand, if the compression unit 1202 has the above-mentioned two kinds of compression processing, and has executed compression processing that assures a high resolution but a low compression ratio of an image, the unit 1203 instructs the compression unit 1202 to switch the compression processing to the one that assures a low resolution but a high compression ratio of an image. If it is detected that the camera control is complete, the unit 1203 instructs the compression unit 1202 to restore an initial state in step S74.

As described above, according to the second embodiment, even when the user normally observes an image with a low frame rate and a high resolution, since the compression processing is automatically switched to a compression scheme that can increase the frame rate (a compression scheme with a high compression ratio) during the camera control, the user can recognize the camera control state in real time by watching the displayed image.

Also, according to the second embodiment, the compression processing is automatically switched to a compression scheme that can set a high compression ratio and frame rate during the camera control, and is reverted to an initial state, i.e., to an initial compression method, or the compression processing is stopped upon completion of the camera control. Hence, the user can easily recognize the control state during the camera control while he or she normally observes an image with a high resolution.

[Third Embodiment]

Figure 18:
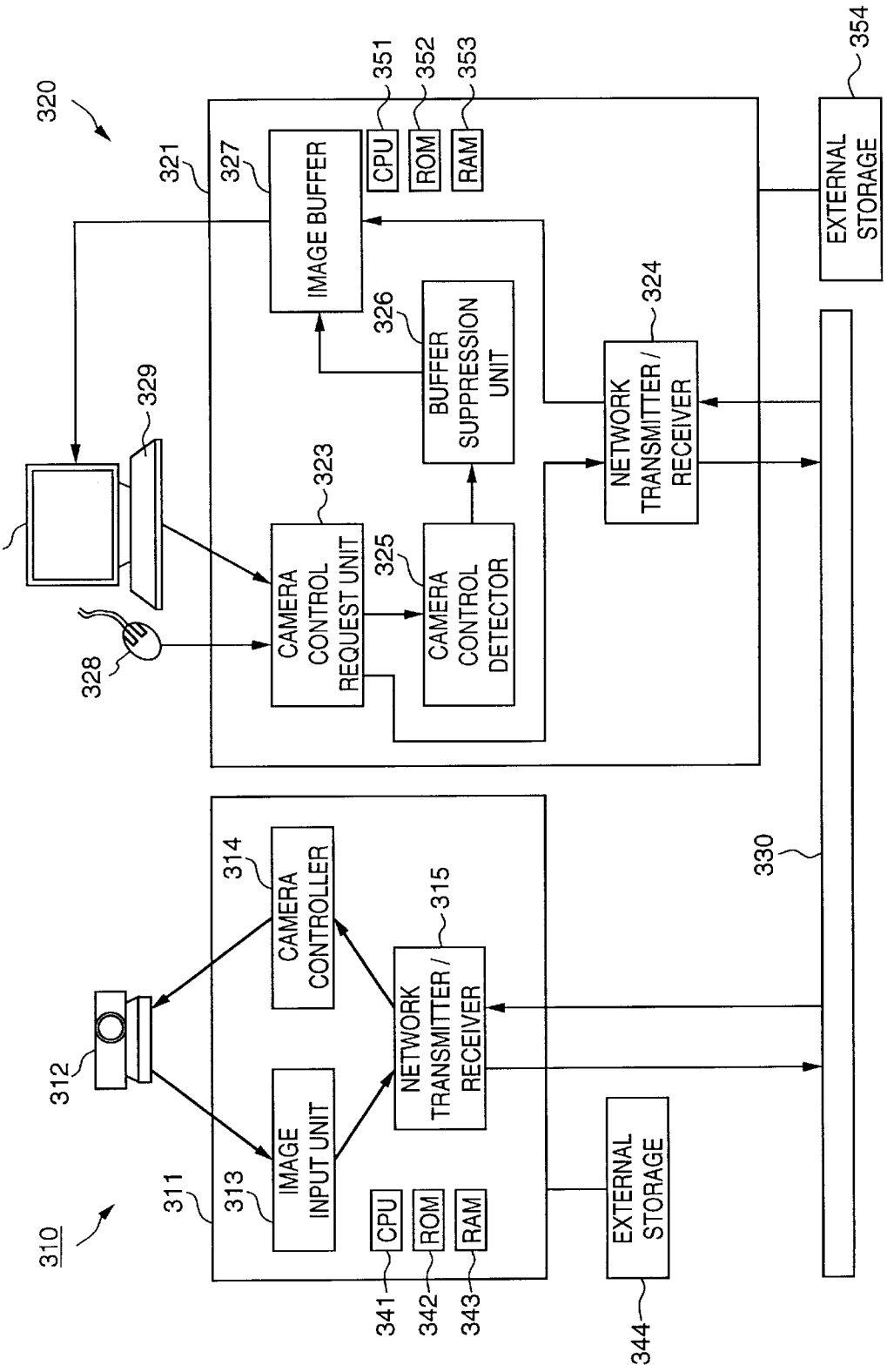
FIG. 18 is a block diagram for explaining the arrangement of an image transmission system according to the third embodiment of the present invention.

FIG. 18 is a block diagram for explaining the arrangement of an image communication system according to the third embodiment of the present invention. Reference numerals 310 and 320 denote communication terminals, terminal main bodies 311 and 321 of which comprise CPUs 341 and 351, ROMs 342 and 352, RAMs 343 and 353, external storage devices 344 and 354, and the like as in a normal computer. The communication terminals 310 and 320 are connected via a network 330 to communicate with each other. Note that the communication terminal 310 serves as a camera management (control) device, and the communication terminal 320 serves as a client.

Reference numeral 312 denotes a video camera. Reference numeral 313 denotes an image input unit which captures an analog image signal output from the video camera 312 and converts it into digital data. Reference numeral 314 denotes a camera controller, which controls the pan and tilt angles, zoom value, and the like of the video camera 312 (such control will be referred to as position control hereinafter). Reference numeral 315 denotes a network transmitter/receiver, which transmits a packet onto the network 330 and receives a packet flowing on the network 330. The arrangements of the above-mentioned image input unit 313, camera controller 314, and network transmitter/receiver 315 are realized by hardware components complying with their arrangements and by appropriately controlling these hardware components by executing a control program stored in the ROM 342 or RAM 343 by the CPU 341.

The arrangement of the communication terminal 320 on the client side will be explained below.

Reference numeral 327 denotes an image buffer which stores digital image data received via the network 330. The image buffer 327 uses the RAM 353 or the external storage device 354 to make up a First-In, First-Out memory that can read out initially stored data first. Reference numeral 322 denotes a display (monitor) which performs various kinds of display under the control of the CPU 351. The received image is also displayed on the display 322. Reference numeral 328 denotes a mouse as a pointing device; and 329, a keyboard.

Reference numeral 323 denotes a camera control request unit, which converts an instruction of the pan or tilt angle, zoom value, or the like input by the mouse 328 or keyboard 329 into a command, and transfers the command to a network transmitter/receiver 324 to transmit it to the communication terminal 310. Reference numeral 326 denotes a buffer suppression unit, which instructs the image buffer 327 to buffer image data or to directly display the image data on the display 322 without storing the image data into the image buffer 327. Reference numeral 325 denotes a camera control detector, which detects if a camera control request is issued, and supplies the detection result to the buffer suppression unit 326. The network transmitter/receiver 324 transmits a packet onto the network 330, and receives a packet flowing on the network 330.

The above-mentioned units denoted by reference numerals 323 to 327 are realized by hardware components complying with their arrangements and by appropriately controlling these hardware components by executing a control program stored in the ROM 352 or RAM 353 by the CPU 351.

Figure 19:
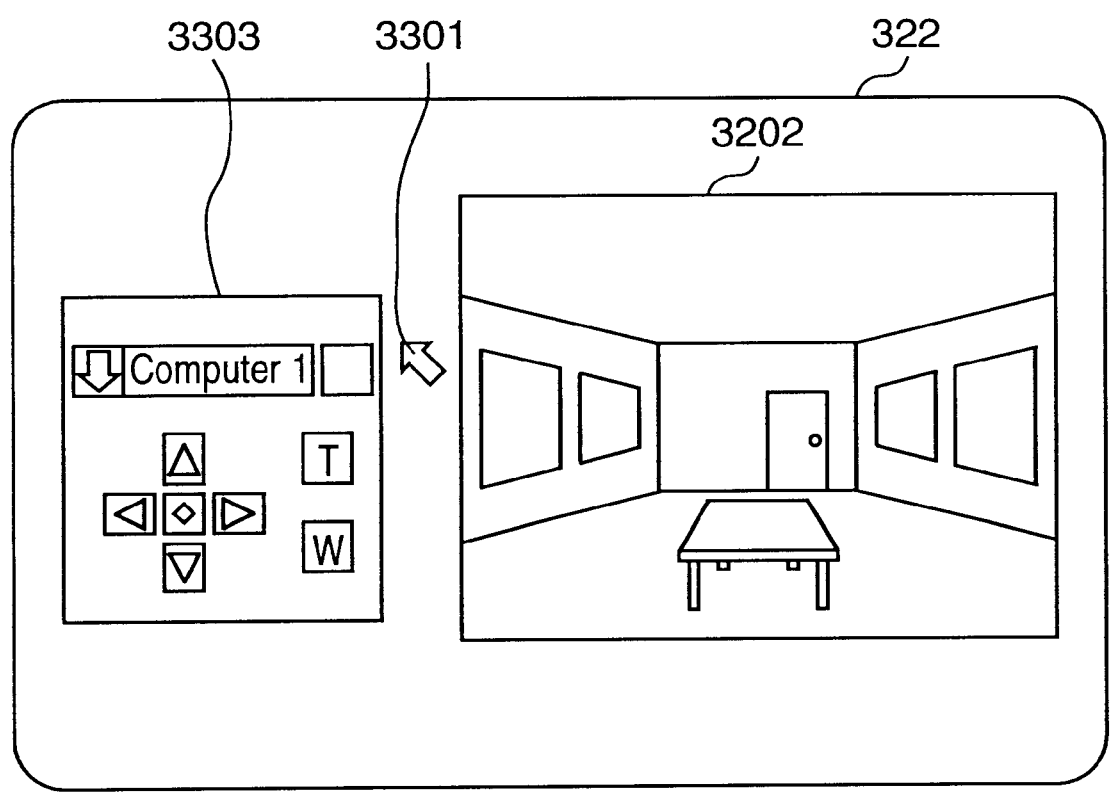
FIG. 19 is a view showing a display example at a communication terminal of the third embodiment.

FIG. 19 shows a display example on the display 322 at the communication terminal 320 (client) of the third embodiment.

In FIG. 19, reference numeral 3301 denotes a mouse cursor displayed on the display 322. As is well known, the mouse cursor 3301 can freely move on the screen upon operation of the mouse 328. Reference numeral 3302 denotes an image displayed on the display 322, which is sent from the video camera 312 of the communication terminal 310. Reference numeral 3303 denotes a user interface for a camera operation.

The operation until the communication terminal 310 outputs image data will be explained below with reference to FIG. 18.

Analog image data output from the video camera 315 of the communication terminal 310 is converted into digital data by the image input unit 313. The digital image data is packetized by the network transmitter/receiver 315, and the obtained packet is output from the communication terminal 310 onto the network 330 at predetermined periods.

Figure 20:
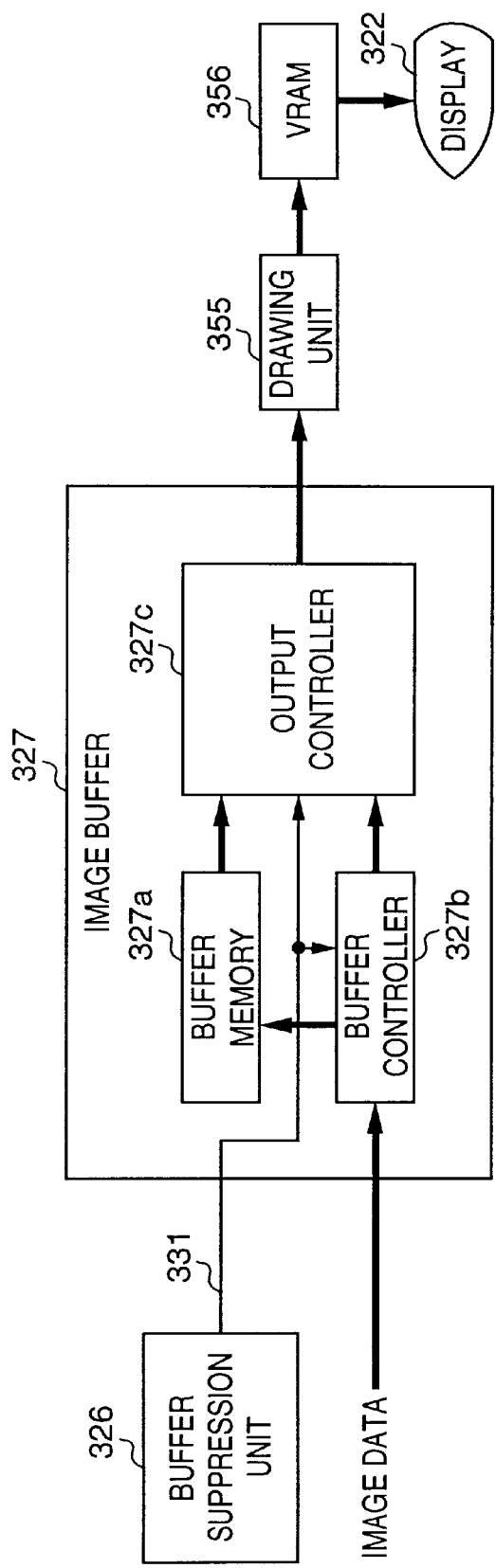
FIG. 20 is a block diagram showing the arrangement of an image buffer and its peripheral portions in the third embodiment in detail.
Figure 21:
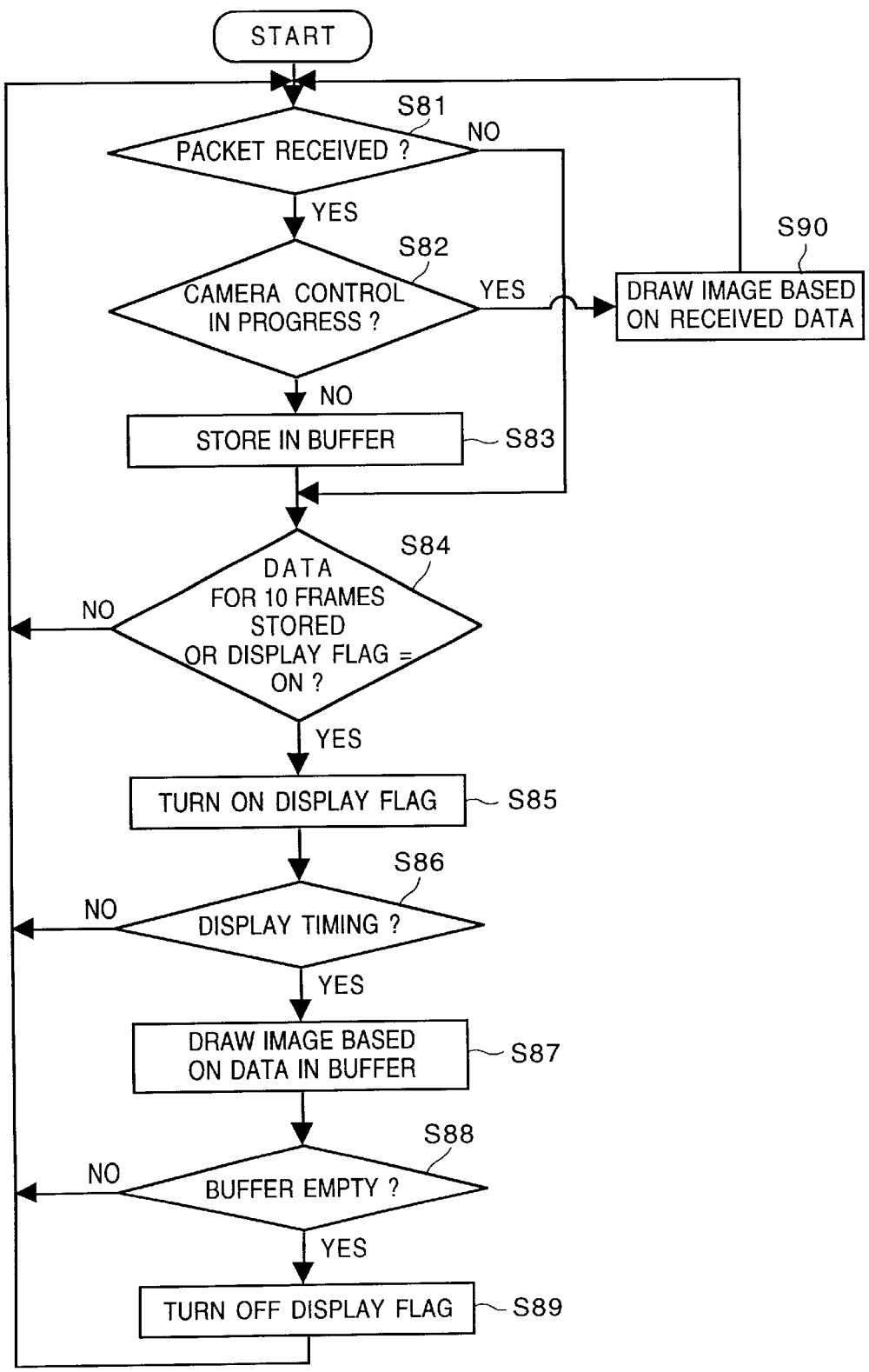
FIG. 21 is a flow chart showing the display sequence of received image data at a communication terminal of the third embodiment.

The operation from when the communication terminal 320 receives image data until it displays that image data will be described below with reference to FIG. 18 and FIGS. 20 and 21. FIG. 20 is a block diagram showing the image buffer 327 of the third embodiment and its peripheral portions in detail. FIG. 21 is a flow chart showing the display sequence of image data received by the communication terminal 320 of the third embodiment.

As shown in FIG. 20, the image buffer 327 comprises a buffer memory 327a, a buffer controller 327b, and an output controller 327c. The buffer memory 327a is assured by using a portion of, e.g., the RAM 353, and can store image data for a maximum of 10 frames in the third embodiment. The buffer controller 327b buffers input image data in the buffer memory 327a when a suppression signal 331 from the buffer suppression unit 326 is OFF, or sends the input image data to the output controller 327c when the suppression signal 331 is ON. When the suppression signal 331 is OFF, the output controller 327c reads out the buffered data from the buffer memory 327a, and outputs it to a drawing unit 355; when the suppression signal 331 is ON, it outputs image data from the buffer controller 327b to the drawing unit 355. As a result, when the suppression signal 331 is ON, input image data is directly output to the drawing unit 355 without being stored in the buffer memory 327a.

The drawing unit 355 draws an image on a VRAM 356 on the basis of the input image data. The image drawn on the VRAM 356 is displayed on the display 322 under the control of a video controller (not shown).

The operation of the buffer suppression unit 326 and the image buffer 327 will be explained in more detail below with reference to the flow chart in FIG. 21.

It is checked in step S81 if a packet of image data is received. If YES in step S81, the flow advances to step S82 to check if the camera control is in progress. This checking step is attained by checking if the suppression signal 331 from the buffer suppression unit 326 is ON, as described above. If NO in step S82, the flow advances to step S83, and the received image data is buffered in the buffer memory 327a.

It is checked in step S84 if image data for 10 frames are stored in the buffer memory 327a, or if a display flag is ON. If image data for 10 frames are buffered, the display flag is turned on to start a display at a predetermined display timing (step S85). If the display timing has been reached in step S86, image data for the oldest frame is read out from the buffer memory 327a, and is drawn on the display 322 (step S87). Note that the readout image data is deleted from the buffer memory 327a. Thereafter, while the display flag is ON, buffering of received image data in the buffer memory 327a and display of image data read out from the buffer memory 327a are parallelly performed. After all the image data are read out from the buffer memory 327a, the display flag is turned off (steps S88 and S89).

When the camera control request unit 323 issues a camera control request during the above-mentioned processing, the camera control detector 325 detects that request, and informs the buffer suppression unit 326 of it. When the buffer suppression unit 326 turns on the suppression signal 331, the buffer controller 327b transfers input image data to the output controller 327c without going through the buffer memory 327a. When the output controller 327c sends the image data to the drawing unit 355, the received image data is displayed without being buffered (steps S82 and S90).

With the above arrangement, image data can be inhibited from being buffered during a camera operation, and an image that has changed by the camera operation can be displayed without any delay time. For this reason, an image can be displayed in real time, and the camera operation is facilitated.

Note that the above description has exemplified a communication system in which the communication terminals have a one-to-one connection. However, the present invention is not limited to such specific system, but can also be applied to a communication system in which the communication terminals have a many-to-many connection. The communication terminals of the third embodiment are classified into a transmission dedicated terminal (communication terminal 310) and a display dedicated terminal (communication terminal 320). However, the present invention is not limited to this, but may be applied to communication terminals which communicate with each other.

As described above, according to the third embodiment, when the camera is remote-controlled by the client device via the network, an image sensed upon executing the position control of the camera is displayed in real time without being buffered, and the displayed image responds well to the position control of the camera, thus improving the operability of the camera.

[Fourth Embodiment]

In the third embodiment, when the image buffer 327 has already stored image data upon operation of the camera, the latest image cannot be displayed until all the buffered image data are read out after camera operation. The fourth embodiment can solve such problem.

Figure 22:
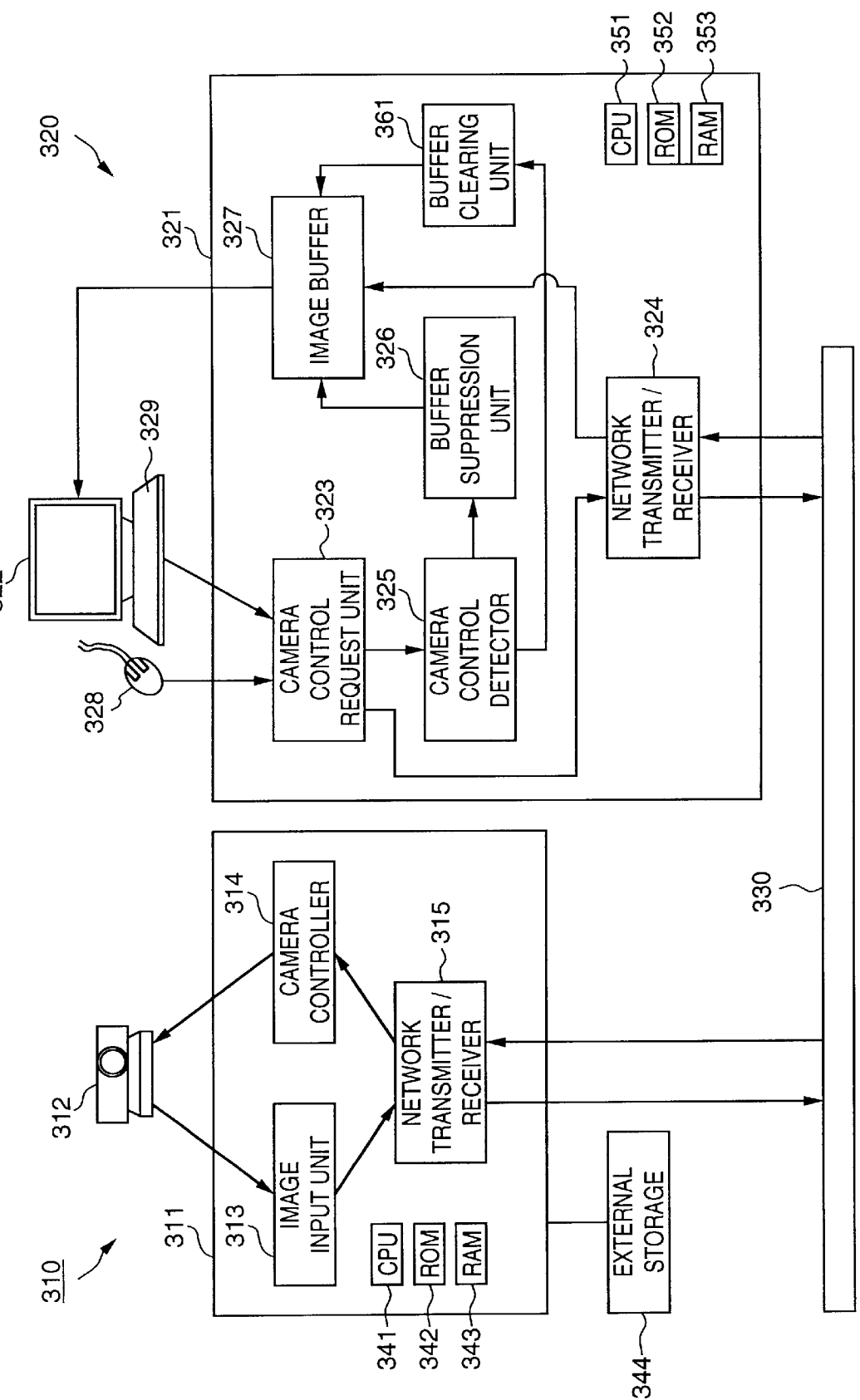
FIG. 22 is a block diagram showing the arrangement of an image communication system according to the fourth embodiment of the present invention.

FIG. 22 is a block diagram showing the arrangement of an image communication system according to the fourth embodiment of the present invention. The same reference numerals in FIG. 22 denote the same parts as those in the arrangement shown in FIG. 18, and a detailed description thereof will be omitted.

Reference numeral 361 denotes a buffer clearing unit, which clears image data buffered in the image buffer 327 when the camera control detector 325 detects user's camera operation.

Figure 23:
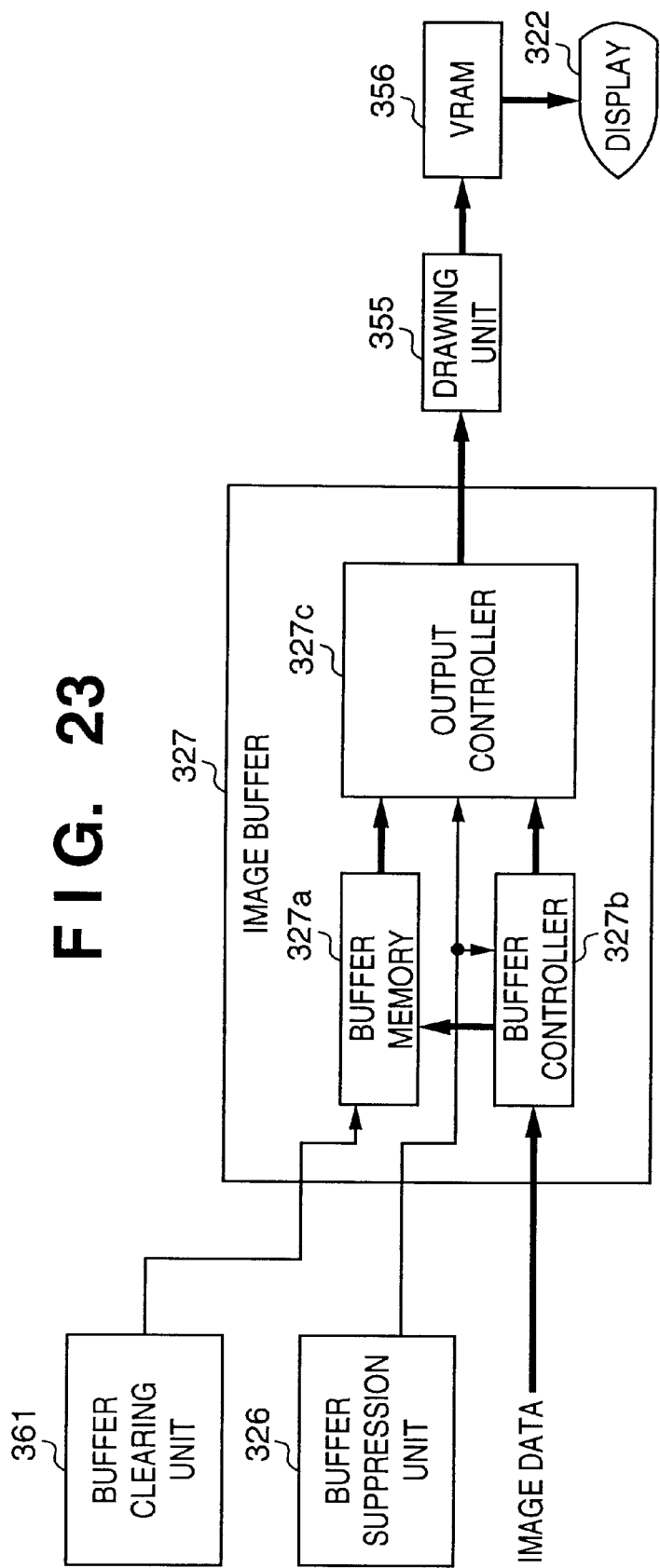
FIG. 23 is a block diagram showing the arrangement of an image buffer and its peripheral portions in the fourth embodiment in detail.

FIG. 23 is a block diagram showing the arrangement of the image buffer 327 in the fourth embodiment and its peripheral portions in detail. The same reference numerals in FIG. 23 denote the same parts as in the third embodiment (FIG. 20). In the fourth embodiment, the buffer clearing unit 361 is arranged to simultaneously clear the image data stored in the buffer memory 327a.

In the above-mentioned arrangement, the console window shown in FIG. 19 is displayed on the display 322 of the communication terminal 320, and when the mouse cursor 3301 is moved on the screen using the mouse 328, the position control of the video camera 312 can be done using the camera control interface 3303. At this time, the control information is input to the camera control request unit 323. The camera control request unit 323 converts that request into a command, and transfers the command to the network transmitter/receiver 324. The network transmitter/receiver 324 converts the command into a packet, and transmits the packet onto the network 330. Upon reception of the packet, the network transmitter/receiver 315 of the communication terminal 310 converts the packet into the command again, and transfers the command to the camera controller 314. The camera controller 314 controls the camera 312 in accordance with the command.

Figure 24:
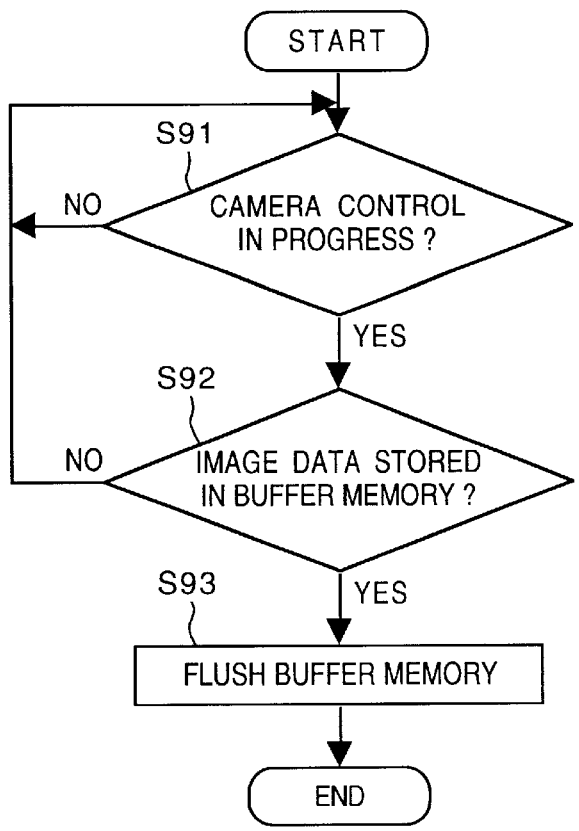
FIG. 24 is a flow chart for explaining the processing sequence of a buffer clearing unit in the fourth embodiment.

FIG. 24 is a flow chart for explaining the processing sequence of the buffer clearing unit 361 of the fourth embodiment.

When a camera control request is supplied to the camera control request unit 323 of the communication terminal 320, the camera control detector 325 detects that request. Upon detection of the camera control request input from the camera control request unit 323, the camera control detector 325 informs the buffer clearing unit 361 of a message indicating it. Upon reception of the message, the buffer clearing unit 361 checks if image data are stored in the buffer memory 327a of the image buffer 327 (steps S91 and S92). If image data are stored in the buffer memory 327a, the buffer clearing unit 361 clears all the image data stored in the buffer memory 327b (step S93).

With the above-mentioned arrangement, image data buffered upon camera position control is not displayed after the position control is complete, and an image can be displayed immediately after the camera position control is complete. In this manner, easy camera operation control is attained.

Note that the fourth embodiment has exemplified a communication system in which the communication terminals have a one-to-one connection, as in the third embodiment. However, the present invention can also be applied to a communication system in which the communication terminals have a many-to-many connection. The communication terminals of the third embodiment are classified into a transmission dedicated terminal (communication terminal 310) and a display dedicated terminal (communication terminal 320). However, the present invention is not limited to this, but may be applied to communication terminals which communicate with each other.

As described above, according to the fourth embodiment, the client can quickly display image data sensed by the camera at the updated position upon completion of the camera control by the client, in addition to the effects of the third embodiment described above.

In the third and fourth embodiments, when the communication terminal on the client side issues a position control instruction of the camera, the client detects the control instruction and suppresses the buffering. However, when the video camera 312 receives the position control instruction, the transmitter terminal of image data may add information indicating that message to image data and transmit the image data, and the client may detect based on the information added to the image data that the camera position control is in progress. In this case, for example, the camera control detector 325 separates the additional information from the received image data packet, and detects if the camera position control is in progress. With this control, when a plurality of clients are connected, even a client that does not execute the camera position control can display an image that follows the position of the camera.

Figure 25:
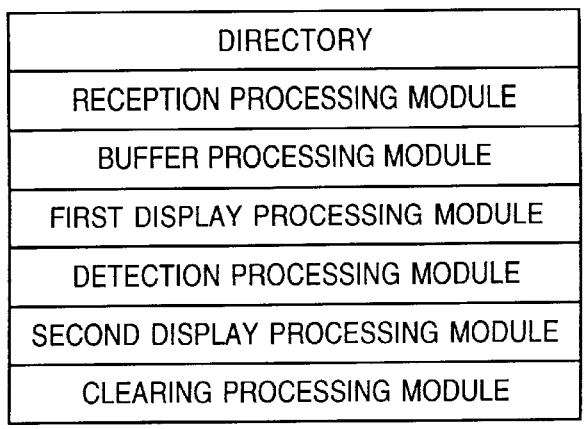
FIG. 25 shows a memory map example of a storage medium that stores a control program according to the third and fourth embodiments of the present invention.

When the program of this embodiment is applied to a storage medium, the storage medium stores program codes corresponding to the flow charts described above. Briefly speaking, the storage medium stores modules shown in a memory map example of FIG. 25. That is, the storage medium stores program codes of, e.g., a "reception processing module", "buffer processing module", "first display processing module", "detection processing module", and "second display processing module". Preferably, the storage medium stores a program code of a "clearing processing module" in addition to the above-mentioned program codes.

These processing modules make up a control program for receiving image information from an external device on the network, and displaying the received image information, and the reception processing module executes reception processing for receiving image information. The buffer processing module implements buffer processing for buffering the received image information. The first display processing module implements first display processing for displaying an image on the basis of the image information stored by the buffer processing. The detection processing module implements detection processing for detecting if an image sensing device that is capturing the image information transmitted from the external device is being controlled. The second display processing module implements second display processing for directly displaying image information received by the reception processing without going through the buffer processing when the detection processing detects that the image sensing device is being controlled. Furthermore, the clearing processing module implements clearing processing for clearing image information stored by the buffer processing when the detection processing detects that the image sensing device is being controlled.

[Fifth Embodiment]

In the fifth embodiment, if a client which is receiving and displaying a camera image has the right of access to that camera, it can change the processing method of an image signal (including media data that includes image and audio data, and the like) to be transmitted via the network. That is, if the client which is receiving an image from the camera has the right of access to that camera, the image is subjected to low-compression coding with less image deterioration, and is transmitted to that client; if the client does not have any right of access, high-compression-coded image data is transmitted to that client.

FIG. 26 is a block diagram showing the arrangement of an image communication system according to the fifth embodiment of the present invention. In this embodiment, one or a plurality of camera server devices 5100 and a plurality of client devices 5200 are connected via a network 5210.

In FIG. 26, reference numeral 5100 denotes a camera server device (camera management device); and 5200, a client device (a display control terminal that can be operated by the user). The camera server device 5100 captures an image signal from a video camera 5103, and distributes the image signal to clients via the network 5210. Upon reception of a camera control command from each client via the network 5210, the camera server device 5100 controls the position and operation of the video camera 5103 in accordance with the received command. In the fifth embodiment, the number of client devices connected to the network 5210 is not particularly limited.

The client device 5200 requests the camera server device 5100 to distribute an image, and observes an image from the camera server device 5100. Also, the client device 5200 issues a camera control request to the camera server device 5100 to execute camera control. In this embodiment, the individual clients can control the video camera 5103 of the camera server device 5100 in turn, but are exclusively controlled, so that only one client device connected to the network 5210 is granted the right of access and can control the camera 5103.

The arrangement of the camera server device 5100 will be explained below.

The camera server device 5100 comprises the video camera 5103, a camera controller 5105 for controlling the pan and tilt angles of the panpod of the video camera 5103, the zoom ratio of the camera 5103, and the like, a video capture unit 5104 for capturing an image from the video camera 5103, a network interface (I/F) 5107 for distributing image data captured by the video capture unit 5104 onto the network 5210, a CPU 5101 which controls the individual units and includes a main memory unit 5102, and a secondary storage unit 5106 for storing a control program and various data. Note that the camera controller 5105 receives a camera control command sent from the client device 5200 via the network I/F 5107, and can control the pan and tilt angles, zoom ratio, and the like of the video camera 5103. The video capture unit 5104 captures an image signal from the video camera 5103, A/D-converts the captured image signal, compresses the digital video data, and then transfers it to the network I/F 5107. As the image compression scheme, Motion JPEG or the like may be used, but the present invention is not limited to a specific scheme. Reference numeral 5108 denotes a system bus for connecting the above-mentioned units.

The arrangement of the client device 5200 will be described below.

The compressed image data distributed from the camera server device 5100 is received via a network interface (I/F) 5204, is expanded under the control of a CPU 5201, and is displayed on the screen of a display 5203. Note that a user interface window for issuing an acquisition request of the right of access is displayed on the screen of the display 5203 in addition to a window for displaying the received image. Reference numeral 5202 denotes a main memory unit for storing a control program executed by the CPU 5201, and the like; 5206, an input unit comprising a pointing device such as a mouse, a keyboard, and the like; and 5205, a secondary storage unit such as a hard disk or the like, which stores various programs, data, and the like executed by the CPU 5201. Reference numeral 5207 denotes a system bus for connecting these units.

Figure 27:
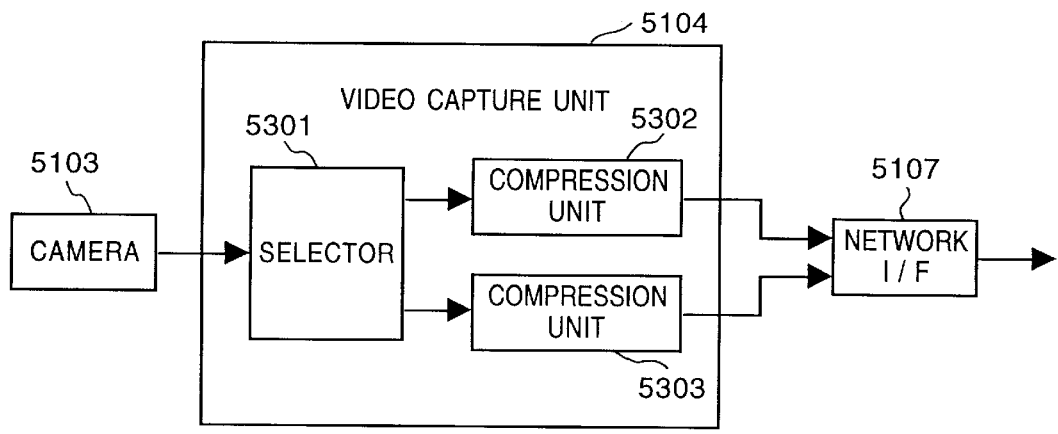
FIG. 27 is a block diagram showing the arrangement of a video capture unit of the fifth embodiment.

FIG. 27 is a block diagram showing the arrangement of the video capture unit 5104 of the fifth embodiment.

The video capture unit 5104 comprises a selector 5301 for selecting one of compression units, which compresses an image signal from the video camera 5103, a compression unit 5302 for performing high-compression coding, and a compression unit 5303 for performing low-compression coding.

More specifically, when an image signal is transmitted to a client device which has no right of access to the video camera 5103, the selector 5301 supplies the image signal to the compression unit 5302, which performs high-compression coding of the input image signal. With this control, an image which has a small coded data volume but low image quality upon reproduction is transmitted to the client device which has no right of access. In contrast to this, for a client device having the right of camera access, the selector 5301 selects the compression unit 5303, which performs low-compression coding of the image signal, and the coded signal is transmitted. With this control, the client device which has the right of access can receive the compressed image signal, which has high image quality upon reproduction although it has a large code data volume.

In this manner, a normal image is reproduced on the client device having no right of camera access, and a high-quality image that allows easy camera control is reproduced and displayed on the client device which has the right of camera access and makes camera control.

Figures 29, 30:
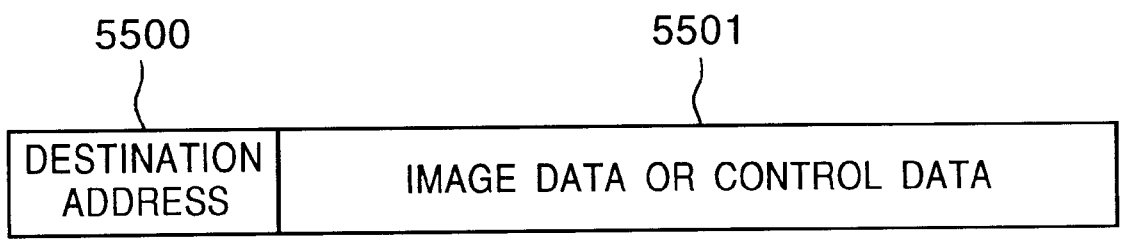
FIG. 29 shows the format of a transmission destination table of the fifth embodiment.
FIG. 30 shows the data format of image data of the fifth embodiment.

FIG. 29 is a view for explaining the format of a transmission destination table 5111 assured on the main memory unit 5102 of the camera server device 5100 of the fifth embodiment.

The transmission destination table 5111 registers client names to which images are transmitted, and the "presence/absence" of the right of control in correspondence with the client names.

FIG. 30 shows the data format of image data to be transmitted from the camera server device 5100 to the client device 5200. A transmission destination address 5500 is stored, and corresponding image data 5501 is stored.

Figure 31:
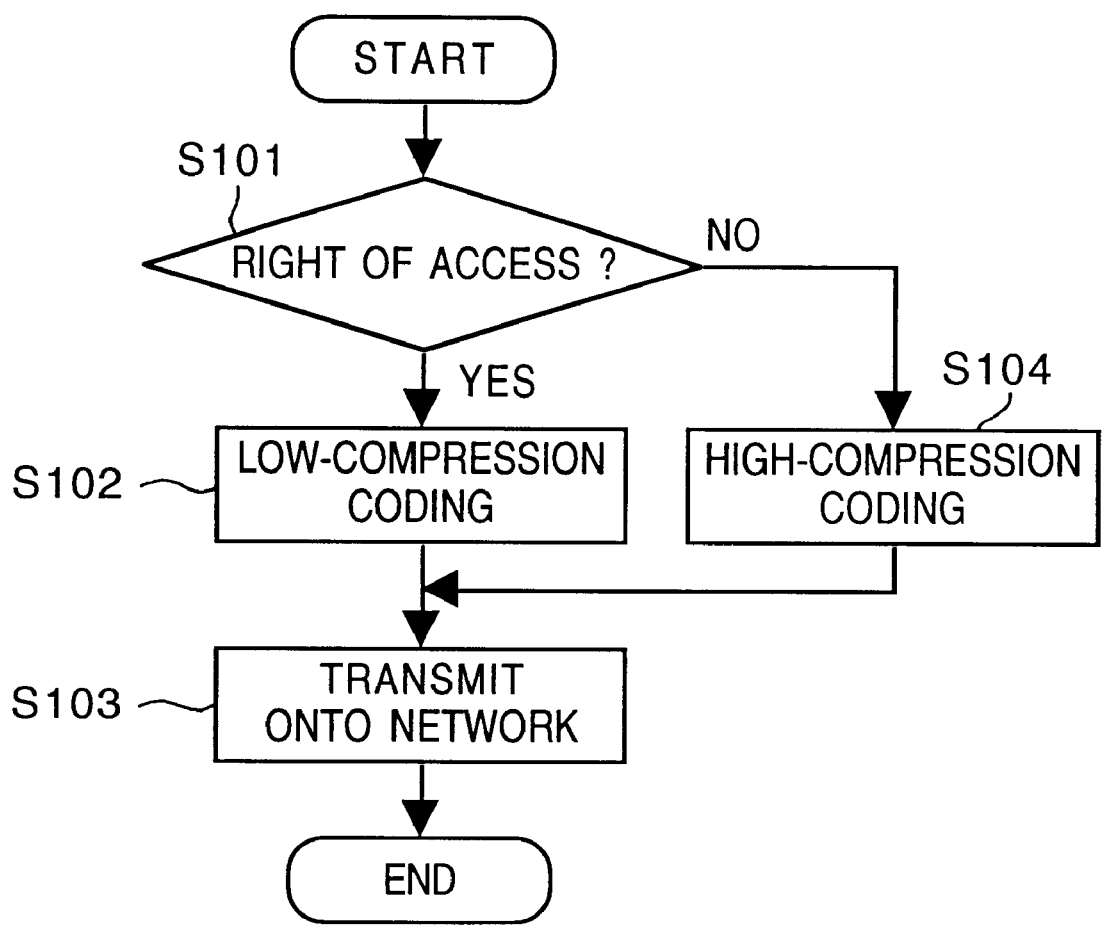
FIG. 31 is a flow chart showing the processing at a camera server device of the fifth embodiment.

FIG. 31 is a flow chart showing the processing in the camera server device 5100 of the fifth embodiment. A control program that executes this processing is stored in the main memory unit 5102. Note that this program may be stored in the secondary storage unit 5106, and may be loaded onto the main memory unit 5102 when it is executed.

This processing is started upon transmission of an image to the client device in response to an image signal request from the client device 5200, generation of a timer event, or the like. In step S101, it is checked if the client device 5200 of interest has the right of access. If YES in step S101, the flow advances to step S102, and the selector 5301 in FIG. 27 outputs the image signal from the video camera 5103 to the compression unit 5303 to perform low-compression coding of the image data. The compressed image signal is transmitted to the client device 5200 in the format shown in FIG. 30 via the network I/F 5107 and the network 5210.

On the other hand, if the client device 5200 of interest has no right of access, the flow advances to step S104, and the selector 5301 selects the compression unit 5302 to compress the image signal. The compressed image signal is transmitted to the client device in the format shown in FIG. 30 via the network I/F 5107 and the network 5210 (S103).

[Sixth Embodiment]

Figure 28:
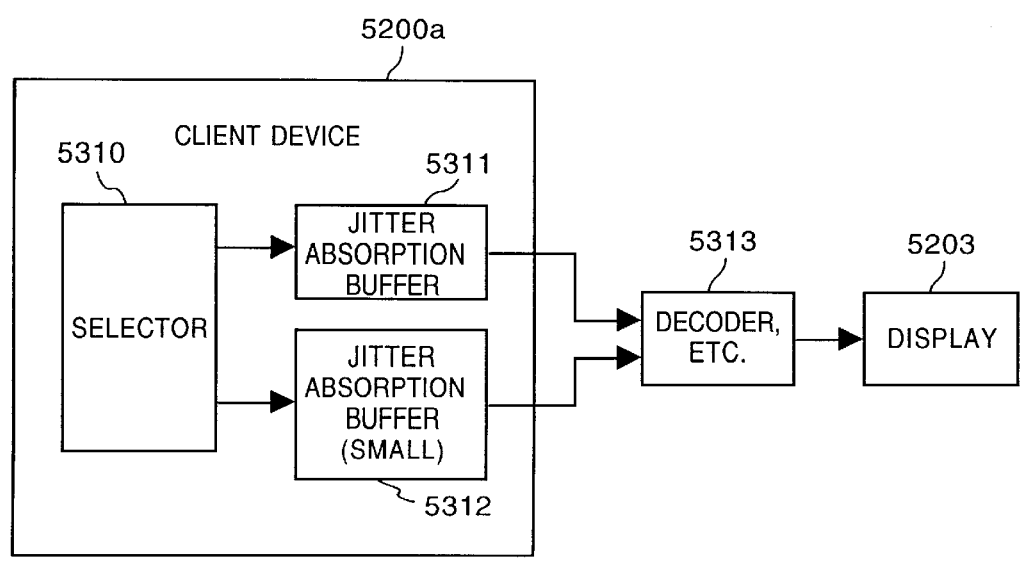
FIG. 28 is a block diagram showing the arrangement of a client device according to the sixth embodiment of the present invention.

FIG. 28 is a block diagram showing the functional arrangement of a client device 5200a according to the sixth embodiment of the present invention.

The client device 5200a comprises a selector 5310 which selects one of jitter absorption buffers used upon reception of image data transmitted via the network I/F 5107 and the network 5210, a large-capacity jitter absorption buffer 5311, and a small-capacity jitter absorption buffer 5312.

The camera server device 5100 transmits a control packet that instructs to use the large-capacity jitter absorption buffer to the client device having no right of access to the video camera 5103, and also transmits image data. In response to this control packet, the client device 5200a selects the relatively large-capacity jitter absorption buffer 5311 using the selector 5310. In this manner, on the client device 5200a having no right of access, an image with a long delay time is decoded and displayed. On the contrary, the camera server device 5100 transmits a control packet that instructs to use the small-capacity jitter absorption buffer 5312 to the client device 5200a having the right of camera access, and transmits corresponding image data. In response to this control packet, the client device 5200a selects the small-capacity jitter absorption buffer 5312 using the selector 5310. In this manner, the client device 5200a with the right of access can reduce the buffer capacity for jitter absorption, and can reproduce and display image data decoded by an image decoder 5313 (the video capture unit 5104). With this control, on the client device 5200a that makes camera control, an image with a short response time, i.e., a short delay time can be reproduced and displayed.

Figure 32:
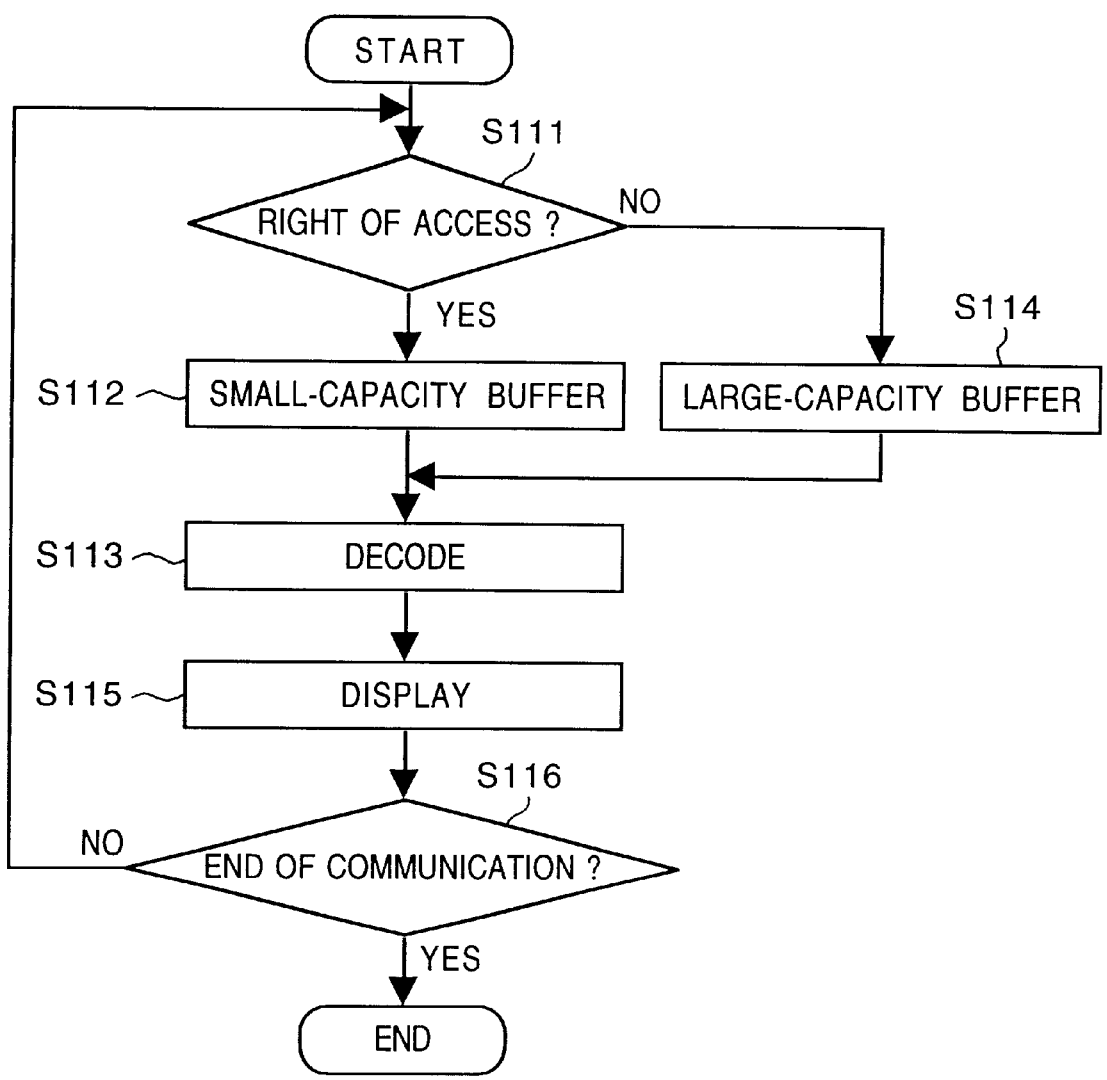
FIG. 32 is a flow chart showing the processing at a client device according to the sixth embodiment of the present invention.

FIG. 32 is a flow chart showing the processing in the client device 5200a according to the sixth embodiment of the present invention. This processing program is stored in the main memory unit 5202. Note that this program may also be stored in the secondary storage unit 5205 and may be loaded onto the main memory unit 5202 when it is executed. This processing is started when the camera server device 5100 starts in response to an image signal request from the client device.

Upon reception of a control packet addressed to the own terminal, it is checked if the own terminal has the right of camera access (S111). If YES in step S111, an image signal received from the camera server device 5100 is stored in the small-capacity jitter absorption buffer 5312 (S112). The image data stored in the buffer 5312 is decoded in units of frames (S113), and the decoded image data is displayed on the display 5203 (S115). This control is to end upon completion of communications or upon expiration of a predetermined camera access right period. On the other hand, if it is determined based on the control packet addressed to the own terminal that the own terminal has no right of camera access (S111), the large-capacity jitter absorption buffer 5311 is used (S114).

As described above, according to the fifth embodiment, since the processing method of image data addressed to the client terminal with the right of camera access is controlled to be different from that of image data addressed to the client terminal with no right of camera access, the camera control can be facilitated.

Also, according to this embodiment, the client device having no right of camera access can display and confirm an image at high speed, and the client device having the right of camera access can display an image that allows easy camera control.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

In the above description, the individual embodiments have been independently explained for the sake of simplicity. However, the present invention is not limited to such specific embodiments, and may be applied to appropriate combinations of he arrangements of the above-mentioned embodiments.

The present invention is not limited to the above embodiments and various changes and modifications can be made within the spirit and scope of the present invention.

Therefore, to apprise the public of the scope of the present invention, the following claims are made.

What is claimed is:

1. An image transmission system including an image sensing control apparatus for transmitting an image signal sensed by an image sensing device to a client via a network, and a plurality of clients, the image sensing control apparatus comprising: determination means for determining whether or not a client being a destination of the image signal has a right of an operation of the image sensing device;

process control means for selecting image quality of the image signal from the image sensing device in accordance with a determination result of said determination means and processing the image data based on the image quality; and transmission means for transmitting the image signal processed by said process control means to the client via the network, wherein the client requests the image signal sensed by the image sensing device and acquires of the right of an operation of the image sensing device.

2. The system according to claim 1, wherein said process control means selects the image quality of high-compression coding of the image signal when said determination means determines that the client does not have the right of access.

3. The system according to claim 1, wherein said process control means selects the image quality of low-compression coding of the image signal when said determination means determines that the client does not have the right of access.

4. An image transmission system including an image sensing control apparatus for transmitting an image signal sensed by an image sensing device to a client via a network, and a plurality of clients, the image sensing control apparatus comprising:

transmission means for transmitting an image signal to a client; and storage capacity control means for instructing a storage capacity of a buffer for temporarily storing the image signal in the client in accordance with whether the client has the right to access the image sensing device, wherein the client switches the storage capacity of the buffer for temporarily storing the image signal in accordance with an instruction instructed by said storage capacity control means.

5. The system according to claim 4, wherein said storage capacity control means instructs the client to use a large-capacity jitter absorption buffer when the client has no right to access the image sensing device.

6. The apparatus according to claim 4, wherein said storage capacity control means instructs the client to use a small-capacity jitter absorption buffer when the client has the right to access the image sensing device.

7. An image transmission method in an image transmission system including an image sensing control apparatus for transmitting an image signal sensed by an image sensing device to a client via a network, and a plurality of clients, the method comprising:

a determination step of determining whether or not a client being a destination of an image signal has a right of an operation of the image sensing device;

a process control step of selecting image quality of the image signal from the image sensing device in accordance with a determination result in said determination step and processing the image data based on the image quality; and a transmission step of transmitting the image signal processed in said process control step to the client via the network, wherein the client requests the image signal sensed by the image sensing device and acquires of the right of an operation of the image sensing device.

8. The method according to claim 7, wherein in said process control step, the image quality of high-compression coding of the image signal is selected when it is determined that the client does not have the right of access in said determination step.

9. The method according to claim 7, wherein in said process control step, the image quality of low-compression coding of the image signal is selected when it is determined that the client has the right of access in said determination step.

10. An image transmission method in an image transmission system including an image sensing control apparatus for transmitting an image signal sensed by an image sensing device to a client via a network, and a plurality of clients, the method comprising:

a transmission step of transmitting an image signal to a client;

an instruction step of instructing a storage capacity of a buffer for temporarily storing the image signal in the client in accordance with whether the client has the right to access the image sensing device, and a step of switching the storage capacity of the buffer for temporarily storing the image signal in accordance with an instruction instructed in said instruction step.

11. The method according to claim 10, wherein in said instruction step, the client is instructed to use a large-capacity jitter absorption buffer when the client has no right to access the image sensing device.

12. The method according to claim 10, wherein in said instruction step, the client is to use a small-capacity jitter absorption buffer when the client has the right to access the image sensing device.

13. An image sensing control apparatus for transmitting an image signal sensed by an image sensing device to a client via a network, comprising:

determination means for determining whether or not a client being a destination of the image signal has a right of an operation of the image sensing device, in a case where the client requests an image signal sensed by the image sensing device;

process control means for selecting image quality of the image signal from the image sensing device in accordance with a determination result of said determination means and processing the image data based on the image quality; and transmission means for transmitting the image signal processed by said process control means to the client via the network.

14. The apparatus according to claim 13, wherein said process control means selects the image quality of high-compression coding of the image signal when said determination means determines that the client does not have the right of access.

15. The apparatus according to claim 13, wherein said process control means selects the image quality of low-compression coding of the image signal when said determination means determines that the client has the right of access.

16. An image sensing control apparatus for transmitting an image signal sensed by an image sensing device to a client via a network, comprising:

transmission means for transmitting an image signal to a client in response to a request from the client; and storage capacity control means for instructing a storage capacity of a buffer for temporarily storing the image signal in the client in accordance with whether the client has the right to access the image sensing device.

17. An image transmitting apparatus for transmitting an image signal sensed by an image sensing device to a client via a network, comprising:

determination means for determining whether or not a client has a right of an operation of the image sensing device;

generation means for generating an image signal having an image quality in accordance with a determination result of said determination means; and transmission means for transmitting the image signal generated by said generation means to the client.

18. The apparatus according to claim 17, wherein said generation means generates an image signal having the image quality of high-compression coding when said determination means determines that the client does not have the right of access.

19. The apparatus according to claim 17, wherein said generation means generates an image signal having the image quality of low-compression coding when said determination means determines that the client has the right of access.

20. A method of transmitting an image signal sensed by an image sensing device to a client via a network, comprising the steps of:

determining whether or not a client has a right of an operation of the image sensing device; generating an image signal having an image quality decided in accordance with a determination result in said determining step; and transmitting the image signal generated in said generating step to the client.

21. The method according to claim 20, wherein in said generation step, the image signal having the image quality of high-compression coding is generated in said generating step when it is determined that the client does not have the right of access in said determining step.

22. The method according to claim 20, wherein in said generation step, the image signal having the image quality of low-compression coding is generated in said generating step when it is determined that the client has the right of access in said determining step.

* * * * *